(12) United States Patent
Lim et al.

(10) Patent No.: US 8,711,909 B2
(45) Date of Patent: Apr. 29, 2014

(54) COMMUNICATION DEVICE AND TWO-DIMENSIONAL COMMUNICATION SYSTEM USING THE SAME

(75) Inventors: Azman Osman Lim, Koganei (JP); Youiti Kado, Koganei (JP); Kiyohiko Hattori, Koganei (JP); Bing Zhang, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 967 days.

(21) Appl. No.: 12/675,675

(22) PCT Filed: Aug. 26, 2008

(86) PCT No.: PCT/JP2008/002309
§ 371 (c)(1),
(2), (4) Date: Mar. 28, 2010

(87) PCT Pub. No.: WO2009/028171
PCT Pub. Date: Mar. 5, 2009

(65) Prior Publication Data
US 2010/0208782 A1    Aug. 19, 2010

(30) Foreign Application Priority Data
Aug. 27, 2007    (JP) .................................. 2007-220393

(51) Int. Cl.
H04B 1/38    (2006.01)
(52) U.S. Cl.
USPC .......................................... 375/220; 375/257

(58) Field of Classification Search
CPC ..... H04B 5/0012; H04B 5/0037; H04B 13/00
USPC ................................... 375/219, 220, 257, 258
See application file for complete search history.

(56) References Cited

U.S. PATENT DOCUMENTS

2007/0097562 A1    5/2007    Shinoda
2007/0117520 A1    5/2007    Asamura et al.

FOREIGN PATENT DOCUMENTS

EP    1635490 A1    3/2006
EP    1635491 A1    3/2006
(Continued)

OTHER PUBLICATIONS

Shinoda, H.; Makino, Y.; Yamahira, N.; Itai, H., "Surface Sensor Network Using Inductive Signal Transmission Layer," Networked Sensing Systems, 2007. INSS '07. Fourth International Conference on , vol., No., pp. 201,206, Jun. 6-8, 2007.*

(Continued)

*Primary Examiner* — Shuwang Liu
*Assistant Examiner* — David Huang
(74) *Attorney, Agent, or Firm* — Lowe Hauptman & Ham, LLP

(57) ABSTRACT

A switch circuit connects a switch (SW) to a connector when a connector receives a signal and connects the switch (SW) to a terminal when the connector receives power. The connector receives a signal and power transmitted at the same frequency, outputs the received signal to a communication unit through an attenuator, and outputs the received power to a power receiving unit. The communication unit carries out reception processing to the signal and outputs the processed signal to a computer. The power receiving unit carries out reception processing to the power and stores the processed power. The power receiving unit supplies the communication unit or the computer with the stored power.

16 Claims, 20 Drawing Sheets

(56) References Cited

FOREIGN PATENT DOCUMENTS

| | | |
|---|---|---|
| JP | 11-143600 | 5/1999 |
| JP | 11-143600 A | 5/1999 |
| JP | 2005-295237 A | 10/2005 |
| JP | 2006-024807 A | 1/2006 |
| JP | 2006-094428 A | 4/2006 |
| JP | 2006-094429 A | 4/2006 |
| JP | 2006-270165 A | 10/2006 |
| JP | 2007-129687 A | 5/2007 |
| JP | 2008-295176 A | 12/2008 |

OTHER PUBLICATIONS

Kouta Minamizawa et al. "Two-Dimensional Signal Transmission for Networked Sensing," SICE Annual Conference, Aug. 8-10, 2005. Okayama, Japan.*

Yasutoshi Makino et al. "Sensor Networking Using Two-Dimensional Electromagnetic Wave," Proceedings of the 22nd Sensor Symposium, pp. 83-88, 2005.*

H. Shinoda, "High Speed Sensor Network Formed on Surface of Material," Instrument and Control, vol. 46, No. 2, The Society of Instrument and Control Engineers, Feb. 2007, pp. 98-103.

N. Yamahira et al., "Proximity Connection in Two-Dimensional Signal Transmission," SICE-ICASE International Joint Conference 2006, Oct. 18-21, 2006, pp. 2735-2740.

ISR for PCT/JP2008/002309 dated Sep. 22, 2008.

Japanese Office Action from application No. 2007-220393.

* cited by examiner

COMMUNICATION DEVICE AND TWO-DIMENSIONAL COMMUNICATION SYSTEM USING THE SAME

RELATED APPLICATIONS

The present application is national phase of PCT/JP2008/002309 filed Aug. 26, 2008, and claims priority from Japanese Application Number 2007-220393 filed Aug. 27, 2007, the disclosures of which are hereby incorporated by reference herein in their entirety.

TECHNICAL FIELD

The present invention relates to a communication device for two-dimensional communication and a two-dimensional communication system using the same.

BACKGROUND ART

There has been a known two-dimensional communication system that carries out communication using a sheet shaped sheet device (JP 2006-270165 A). In the two-dimensional communication system, each communication device is provided on the sheet device and communicates with other communication devices through the sheet device.

The conventional communication device for two-dimensional communication includes a signal receiving circuit that receives a signal and a power receiving circuit that receives electric power (Naoshi Yamahira, Yasutoshi Makino, Hiroto Itai, and Hiroyuki Shinoda, "Proximity Connection in Two-Dimensional Signal Transmission," SICE-ICASE International Joint Conference, Busan, Korea, Oct. 18-21, 2006). A power transmitter and a communication device operate separately between the signal transmission side and the power transmission side, and operation is not linked between them. Power for transmission is significantly large as compared to power for a communication signal. Therefore, the signal transmission frequency and the power transmission frequency are sufficiently apart during signal transmission and power transmission, so that communication signals are not buried in interference from the transmitted power, and a connector for receiving signals and a connector for receiving power suitable for respective transmission frequencies are provided on the signal receiving side and the power receiving side in the communication device.

DISCLOSURE OF THE INVENTION

However, in a two-dimensional communication system, in order to sufficiently bring out the performance of a single two-dimensional communication sheet, adjustment according to a corresponding frequency should be necessary, but the range of the frequency band that allows the performance to be improved by such adjustment is limited and the frequency for signal transmission and the frequency for power transmission cannot be sufficiently apart so that communication signals are not buried in interference from transmission power. Therefore, the signal transmission performance and the power transmission performance are not sufficiently brought out.

Therefore, the present invention is directed to a solution to the problem, and it is an object of the present invention to provide a communication device capable of receiving a signal and power while suppressing degradation in the signal transmission performance.

Another object of the present invention is to provide a two-dimensional communication system using a communication device capable of receiving a signal and power while suppressing degradation in the signal transmission performance.

According to the present invention, the communication device carries out communication using a two-dimensional communication medium and includes a connector, a signal processing circuit, and an interface device. The connector receives any of a first transmission wave produced by superposing a signal with a transmission frequency of the two-dimensional communication medium on power with the transmission frequency, a second transmission wave with the transmission frequency, and a third transmission wave including power with the transmission frequency through the two-dimensional communication medium. The interface device carries out reception processing to the signal and reception processing to the power independently from each other based on the first transmission wave, outputs the processed signal to the signal processing circuit, and stores the processed power, when the connector receives the first transmission wave. The interface device carries out reception processing to the second transmission wave and outputs the signal to the signal processing circuit when the connector receives the second transmission wave. The interface device stores the third transmission wave as power when the connector receives the third transmission wave.

The connector preferably receives the first or second transmission wave from the two-dimensional communication medium. The interface device includes a communication unit, a power receiving unit, a separation circuit, and a switch circuit. The communication unit carries out reception processing to the signal and outputs the processed signal to the signal processing circuit. The power receiving unit carries out reception processing to the power and stores the processed power. The separation circuit separates the first transmission wave into the signal and the power, outputs the separated signal to the communication unit, and outputs the separated power to the power receiving unit. The switch circuit connects the connector to the separation circuit when the connector receives the first transmission wave and the connector to the communication unit when the connector receives the second transmission wave.

The separation circuit preferably separates the first transmission wave into the signal and the power by internally dividing the amplitude of the first transmission wave in the ratio of the amplitude of the signal and the amplitude of the power.

The connector preferably receives the second or third transmission wave through the two-dimensional communication medium. The interface device includes a communication unit, a power receiving unit, and a switch circuit. The communication unit carries out receiving processing to the second transmission wave and outputs the processed signal to the signal processing circuit. The power receiving unit carries out reception processing to the third transmission wave and stores the processed power. The switch circuit connects the connector to the communication unit or the power receiving unit in response to the destination of the second transmission wave or the presence/absence of the operation of the communication unit.

The switch circuit preferably connects the connector to the communication unit when the connector receives the second transmission wave including a transmission request signal from a power node capable of transmitting the power. The switch circuit connects the connector to the power receiving unit when the connector receives the second transmission wave including a communication permission signal corresponding to the transmission request signal from a communication node as a communication party with the power node. The power receiving unit carries out reception processing to the third transmission wave received by the connector from the power node and stores the processed power.

The switch circuit preferably connects the connector to the power receiving unit when the communication unit stops communicating and the connector to the communication unit when the communication unit starts to communicate. The power receiving unit carries out reception processing to the third transmission wave received by the connector from the power node and stores the processed power when the communication unit stops communicating.

The communication unit is preferably supplied with power from the power receiving unit.

The switch circuit preferably connects the connector to the communication unit when the connector receives the second transmission wave including a transmission request signal from a power node capable of transmitting the power. The switch circuit preferably keeps the connector and the communication unit connected with each other when the communication unit transmits the second transmission wave including a communication permission signal to the transmission request signal to the power node through the connector.

The switch circuit preferably connects the connector to the communication unit and keeps the connector and the communication unit connected with each other when the connector receives the second transmission wave from a node other than the power node capable of transmitting the power.

The connector preferably receives the first transmission wave from the power node through the two-dimensional communication medium.

The power node is preferably a communication node that receives a plurality of pieces of detection data detected by a plurality of sensors in a sensor system.

According to the present invention, a communication device carries out communication using a two-dimensional communication sheet and includes a plurality of first connectors, a second connector, a signal processing circuit, a recharging circuit, and a receiving circuit. The plurality of first connectors receive a plurality of transmission waves having different frequencies and the same power through the two-dimensional communication medium. The second connector receives one of the plurality of transmission waves through the two-dimensional communication medium with a lower sensitivity than the plurality of first connectors. The recharging circuit carries out reception processing to the plurality of transmission waves received by the plurality of first connectors and stores the processed power. The receiving circuit carries out reception processing to a transmission wave received by the second connector and outputs the processed signal to the signal processing circuit.

Furthermore, according to the present invention, a two-dimensional communication system includes a two-dimensional communication medium and a plurality of communication devices. The two-dimensional communication medium transmits a transmission wave. The plurality of communication devices are provided on the two-dimensional communication medium. The plurality of communication devices each include a communication device according to any one of claims 1 to 12.

According to the present invention, a signal and power are transmitted at the same frequency, the communication device receives the signal and the power, and the signal reception processing to the received signal and power reception to the received power are carried out independently from each other. As a result, it is not necessary to set the signal transmission frequency and the power transmission frequency sufficiently apart so that a communication signal is not buried in interference from the transmission power. Therefore, a two-dimensional communication sheet adjusted for a single frequency can be used.

Therefore, according to the present invention, the signal reception and the power reception can be carried out while suppressing degradation in the signal transmission performance.

According to the present invention, the communication device receives the signal and the power by a single connector.

Therefore, according to the present invention, the communication device can be reduced in size.

Furthermore, according to the present invention, when a transmission source supplies power at the same time, the power for signal transmission and the power for power transmission are the same, so that the signal transmission and the power transmission are carried out simultaneously while the communication signal is not buried in interference from the power for power transmission.

Therefore, according to the present invention, the signal reception and the power reception can be carried out while degradation in the signal transmission performance is suppressed.

Since power transmitted by a plurality of transmission waves is stored, increased power can be transmitted.

BEST MODE FOR CARRYING OUT THE INVENTION

Figure 1:
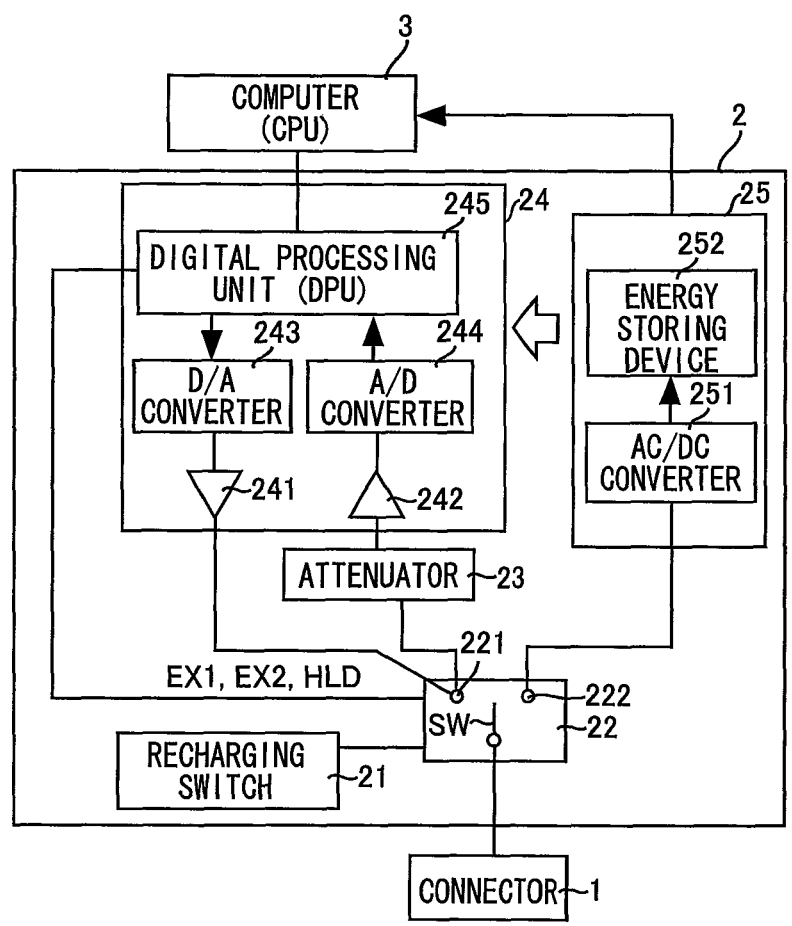
FIG. 1 is a schematic block diagram of the configuration of a communication device according to a first embodiment of the present invention.

Preferred embodiments of the present invention will be described in detail in conjunction with the accompanying drawings. In the drawings, the same or corresponding portions are designated by the same reference characters and their description will not be repeated.

First Embodiment

FIG. 1 is a schematic block diagram of the configuration of a communication device according to a first embodiment of the present invention. Referring to FIG. 1, a communication device 10 according to the first embodiment of the present invention includes a connector 1, an interface device 2, and a computer (CPU: Central Processing Unit) 3.

The connector 1 is provided in contact with a two-dimensional communication sheet that will be described. The connector 1 receives various transmission waves from the two-dimensional communication sheet, outputs the received transmission waves to the interface device 2, and transmits signals received as transmission waves from the interface device 2 to the two-dimensional communication sheet.

The interface device 2 includes a recharging switch 21, a switch circuit 22, an attenuator 23, a communication unit 24, and a power receiving unit 25.

The communication unit 24 includes amplifiers 241 and 242, a D/A converter 243, an A/D converter 244, and a DPU (Digital Processing Unit) 245.

The power receiving unit 25 includes an AC/DC converter 251 and an energy storing device 252.

When turned on, the recharging switch 21 supplies the switch circuit 22 with power, so that the switch circuit 22 attains an operation state. When turned off, the recharging switch 21 stops supplying power to the switch circuit 22, so that the switch circuit 22 attains a stopped state.

The switch circuit 22 includes a switch SW and terminals 221 and 222. The switch circuit 22 attains an operation state upon receiving power from the recharging switch 21, connects the switch SW to the terminal 221, and supplies a transmission wave received from the connector 1 to the attenuator 23. Then, the switch circuit 22 switches the connection of the switch SW from the terminal 221 to the terminal 222 upon receiving a switch signal EX1 from the digital processing unit 245 in the communication unit 24 and from the terminal 222 to the terminal 221 upon receiving a switch signal EX2 from the digital processing unit 245. The switch circuit 22 maintains the connection between the switch SW and the terminal 221 (or 222) upon receiving a hold signal HLD from the digital processing unit 245. The switch circuit 22 outputs a transmission wave received from the connector 1 to the AC/DC converter 251 when the switch SW is connected to the terminal 222.

The attenuator 23 attenuates the level of the transmission wave received from the switch circuit 22 to an allowable level for the communication device 10 and outputs the attenuated wave to the amplifier 242 if the level of the transmission wave exceeds the allowable level for the communication device 10.

The amplifier 241 amplifies an analog signal received from the D/A converter 243 and outputs the amplified analog signal to the switch circuit 22.

The amplifier 242 amplifies an analog signal received from the attenuator 23 and outputs the amplified analog signal to the A/D converter 244.

The D/A converter 243 converts a digital signal received from the digital processing unit 245 into an analog signal and outputs the converted analog signal to the amplifier 241.

The A/D converter 244 converts the analog signal received from the amplifier 242 into a digital signal and outputs the converted digital signal to the digital processing unit 245.

The digital processing unit 245 decodes the digital signal received from the A/D converter 244. If the decoded digital signal is a control packet, the digital processing unit 245 outputs the control packet to the computer 3, generates a switch signal EX1 or EX2 or a hold signal HLD in response to the destination or source of the control packet, and outputs the generated switch signal EX1 or EX2 or hold signal HLD to the switch circuit 22. If the decoded digital signal is not a control packet, the digital processing unit 245 outputs the decoded digital signal to the computer 3.

The digital processing unit 245 modulates the digital signal received from the computer 3 into a prescribed format and outputs the modulated digital signal to the D/A converter 243.

The AC/DC converter 251 converts the AC power of the transmission wave received from the terminal 222 of the switch circuit 22 into DC power and outputs the converted DC power to the energy storing device 252.

The energy storing device 252 stores the DC power received from the AC/DC converter 251 and supplies the stored DC power to the communication unit 24 or the computer 3. Therefore, the computer 3 and the communication unit 24 operate with the power received from the energy storing device 252.

The computer 3 processes the digital signal received from the communication unit 24 of the interface device 2, generates a control packet or a data packet, and outputs the generated packet to the communication unit 24.

Figure 2:
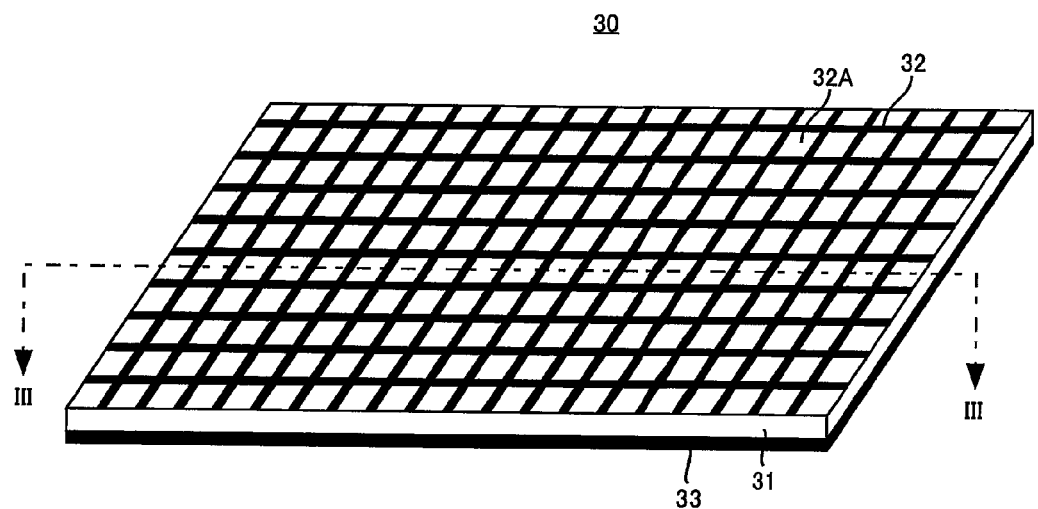
FIG. 2 is a perspective view of a two-dimensional communication sheet.
Figure 3:
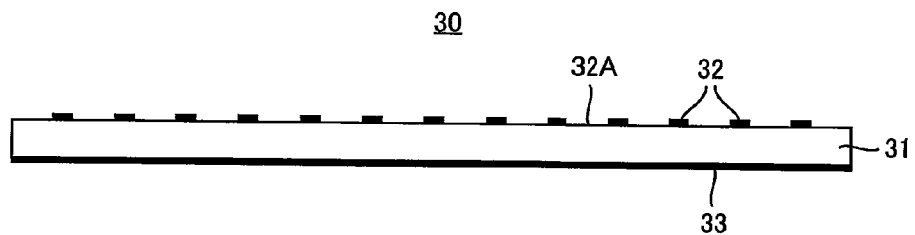
FIG. 3 is a sectional view of the two-dimensional communication sheet taken along line shown in FIG. 2.

FIG. 2 is a perspective view of the two-dimensional communication sheet. FIG. 3 is a sectional view of the two-dimensional communication sheet taken along line shown in FIG. 2.

Referring to FIGS. 2 and 3, the two-dimensional communication sheet 30 includes a dielectric 31 and conductors 32 and 33. The dielectric 31 is for example made of a plastic or foamed material having a substantially even thickness and has a sheet shape. The conductor 32 is for example made of a metal and formed to have a mesh shape at one main surface of the dielectric 31. In this case, an opening 32A surrounded by the mesh-shaped conductor 32 has a regular square shape and a plurality of the openings 32A are arranged at shorter intervals than the electromagnetic wavelength in the surroundings of the two-dimensional communication sheet 30. The conductor 33 is for example made of a metal and formed on the entire surface of the other main surface of the dielectric 31 (on the surface opposite to the surface having the conductor 32).

The mesh-shaped conductor 32 serves to weaken mutual electromagnetic coupling between the surroundings and the sheet shaped dielectric 31, and therefore if it is assumed that the electromagnetic coupling between the surroundings and the dielectric 31 is sufficiently small, an electromagnetic wave propagates at $1/(\mu\in)^{1/2}$ inside the sheet-shaped dielectric 31. In this case, $\mu$ is the magnetic permeability of the dielectric 31 and $\in$ is the dielectric constant of the dielectric 31.

The openings 32A are arranged at shorter intervals than the electromagnetic wavelength in the surroundings of the two-dimensional communication sheet 30. Therefore, an evanescent wave coming out from each of the openings 32A has its electromagnetic phase changed in a shorter spatial cycle than the electromagnetic wavelength and does not form a far propagating wave.

The attenuation coefficient in this case results in $\exp(-(\in/\in_0-1)^{1/2}(\omega/c)z)$ where $\in_0$ is the dielectric constant in the surroundings, $\omega$ is the angular frequency of a signal, c is the speed of light in the surroundings, and z is the distance from the surface of the dielectric 31 having the conductor 32 thereon.

Therefore, if $\in$ is not so large, the area in which an evanescent wave comes out can be reduced to about the level of the wavelength for the small thickness of the dielectric 31.

In this way, the two-dimensional communication sheet 30 allows electromagnetic waves to propagate at $1/(\mu\in)^{1/2}$ and lets an evanescent wave come out from its one main surface (on which the conductor 32 is formed).

Figure 4:
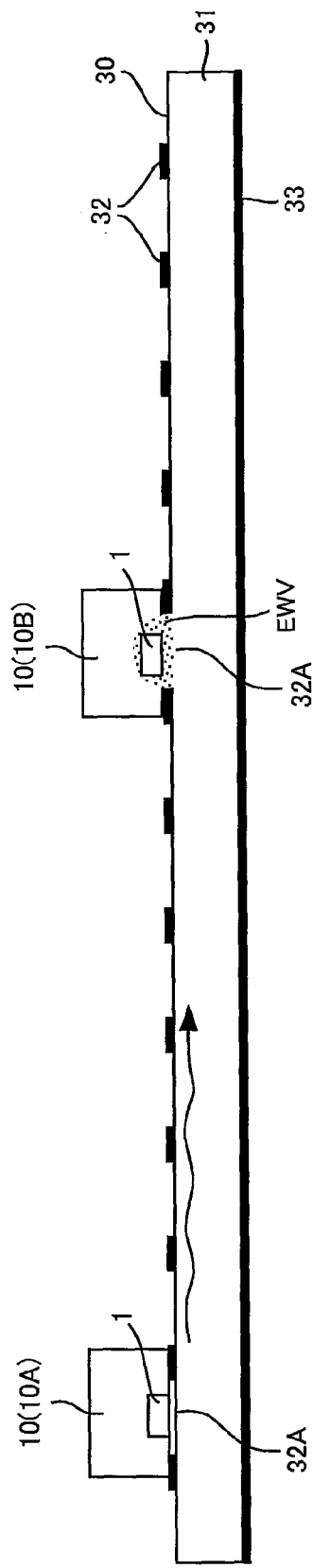
FIG. 4 is a view showing the concept of two-dimensional communication.

FIG. 4 is a diagram showing the concept of two-dimensional communication. Referring to FIG. 4, two communication devices 10A and 10B having the same configuration as the communication device 10 shown in FIG. 1 are provided on the two-dimensional communication sheet 30. In this case, the connectors 1 of the communication devices 10A and 10B are in contact with the openings 32A of the two-dimensional communication sheet 30. The computer 3 of the communication device 10A generates a signal to be transmitted and outputs the generated signal to the digital processing unit 245 in the communication unit 24.

The digital processing unit 245 in the communication device 10A modulates the signal received from the computer 3 into a prescribed format and outputs the modulated signal to the D/A converter 243. The D/A converter 243 of the communication device 10A converts the digital signal from the digital processing unit 245 into an analog signal and outputs the converted analog signal to the amplifier 241.

The amplifier 241 in the communication device 10A amplifies the analog signal received from the D/A converter 243 and outputs the amplified signal to the switch circuit 22. The switch circuit 22 connects the switch SW to the terminal 221 and outputs the analog signal received from the amplifier 241 to the connector 1.

The connector 1 then changes the scalar potential and/or vector potential of a built-in electrode (not shown) in response to the analog signal received from the switch circuit 22. Here, change in the scalar potential corresponds to change in the potential, while change in the vector potential corresponds to change in the current distribution, change in the electric flux density, and change in the displacement current distribution.

When the scalar potential and/or vector potential of the built-in electrode in the connector 1 changes, an electromagnetic wave is generated at the dielectric 31 of the two-dimensional communication sheet 30, and the generated electromagnetic wave propagates only near the surface of the two-dimensional communication sheet 30 (see the arrow in FIG. 4).

The electromagnetic wave propagated to the position of the communication device 10B allows an evanescent wave EWV to be emitted from the opening 32A of the dielectric 32. The connector 1 of the communication device 10B then detects the evanescent wave EWV by its built-in electrode (not shown) and receives an electrical signal transmitted from the communication device 10A.

In this way, the two-dimensional communication is carried out by using the electromagnetic wave transmitted near the surface of the two-dimensional communication sheet 30. Note that the electromagnetic wave generated at the dielectric 31 forms a transmission wave that will be described.

Figure 5:
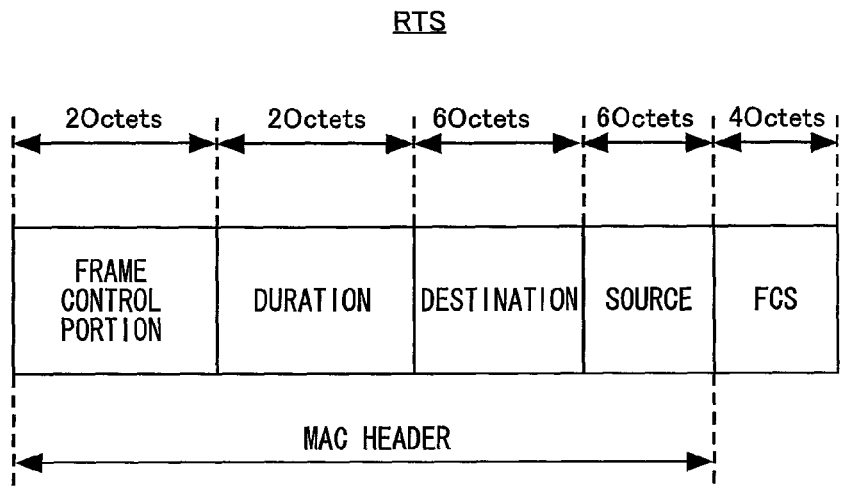
FIG. 5 shows the structure of an RTS (Request To Send) packet.

FIG. 5 is a diagram of an RTS (Request To Send) packet. Referring to FIG. 5, the RTS packet includes a frame control portion, a duration, a destination, a source, and an FCS (Frame Check Sum).

The frame control portion has a length of 2 octets and indicates that it is an RTS packet. The duration has a length of 2 octets and indicates the effective period of the RTS packet. The destination has a length of 6 octets and includes the address for which the RTS packet is destined. The source has a length of 6 octets and includes the address of the source of the RTS packet. The FCS (Frame Check Sequence) has a length of 4 octets and includes an error correction code.

The frame control portion, the duration, the destination, and the source form an MAC (Media Access Control) header.

Figure 6:
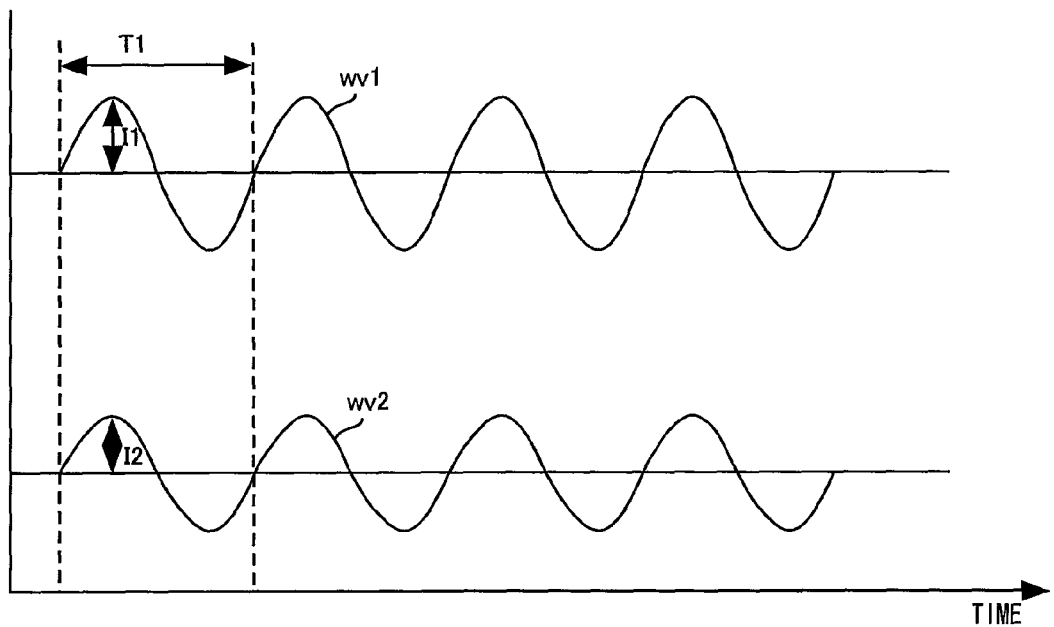
FIG. 6 is a chart showing the concept of transmission waves.

FIG. 6 is a chart showing the concept of transmission waves. Referring to FIG. 6, the communication device 10 transmits a data packet by a transmission wave wv1 having an amplitude I1 and a control packet such as an RTS packet, a CTS (Clear To Send) packet and an ACK (Acknowledge) packet by a transmission wave wv2 having an amplitude I2 (<I1) when the communication device 10 is a sink capable of transmitting electric power. When the communication device 10 is a communication node other than the sink, it transmits a data packet and a control packet by the transmission wave wv2.

The transmission wave wv1 includes an electromagnetic wave having energy storable as electric power and has a cycle T1. The transmission wave wv2 includes an electromagnetic wave having energy smaller than the energy storable as electric power and has the cycle T1. The transmission wave wv1 has for example an energy of 10 W and the transmission wave wv2 has for example an energy of 100 mW.

In this way, the power is transmitted by the transmission wave wv1 having the relatively large amplitude I1 while a signal indicating a control packet is transmitted by the transmission wave wv2 having the relatively small amplitude I2, and the transmission waves wv1 and wv2 have the same frequency f (=1/T1). More specifically, the power and the signal are transmitted by the transmission waves having the same frequency f. The frequency f is a transmission frequency tuned as a frequency that allows easy transmission through the dielectric 31 of the two-dimensional communication sheet 30.

Figure 7:
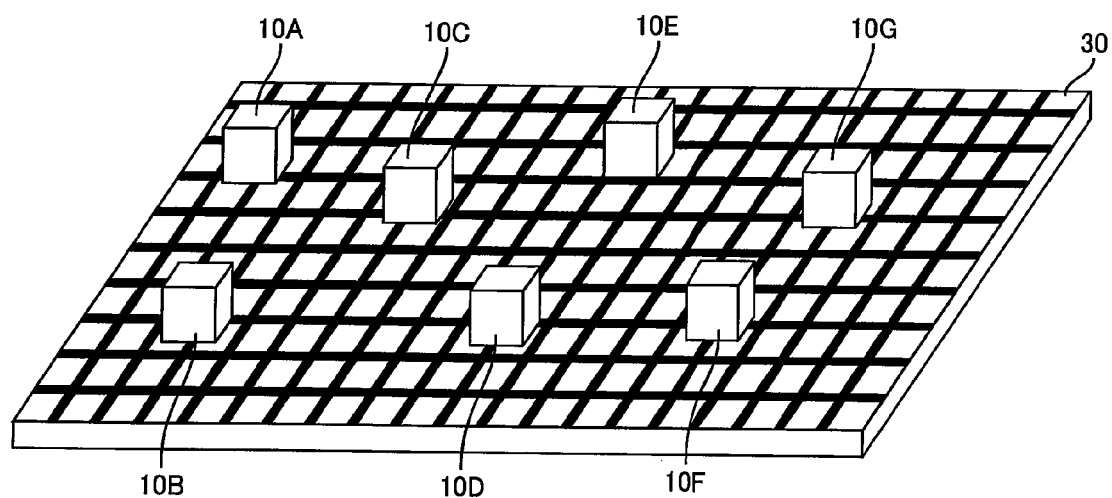
FIG. 7 is a schematic view of a two-dimensional communication system using the communication device shown in FIG. 1.

FIG. 7 is a schematic view of a two-dimensional communication system using the communication device 10 shown in FIG. 1. Referring to FIG. 7, the two-dimensional communication system 100 includes a plurality of communication devices 10A, 10B, 10C, 10D, 10E, 10F, and 10G, and the two-dimensional communication sheet 30. The plurality of communication devices 10A, 10B, 10C, 10D, 10E, 10F, and 10G each consist of the communication device 10 shown in FIG. 1, and the connectors 1 are provided in contact with the two-dimensional communication sheet 30 in arbitrary positions.

One of the plurality of communication devices 10A, 10B, 10C, 10D, 10E, 10F, and 10G, the communication device 10A for example is a sink, and the other communication devices 10B, 10C, 10D, 10E, 10F, and 10G are communication nodes that are not capable of supplying electric power.

Therefore, the communication device 10A transmits a control packet such as an RTS packet, a CTS packet, and an ACK packet by the transmission wave wv2 and a data packet by the transmission wave wv1. The communication devices 10B, 10C, 10D, 10E, 10F, and 10G transmit a control packet such as an RTS packet, a CTS packet, and an ACK packet, and a data packet by the transmission wave wv2.

Figure 8:
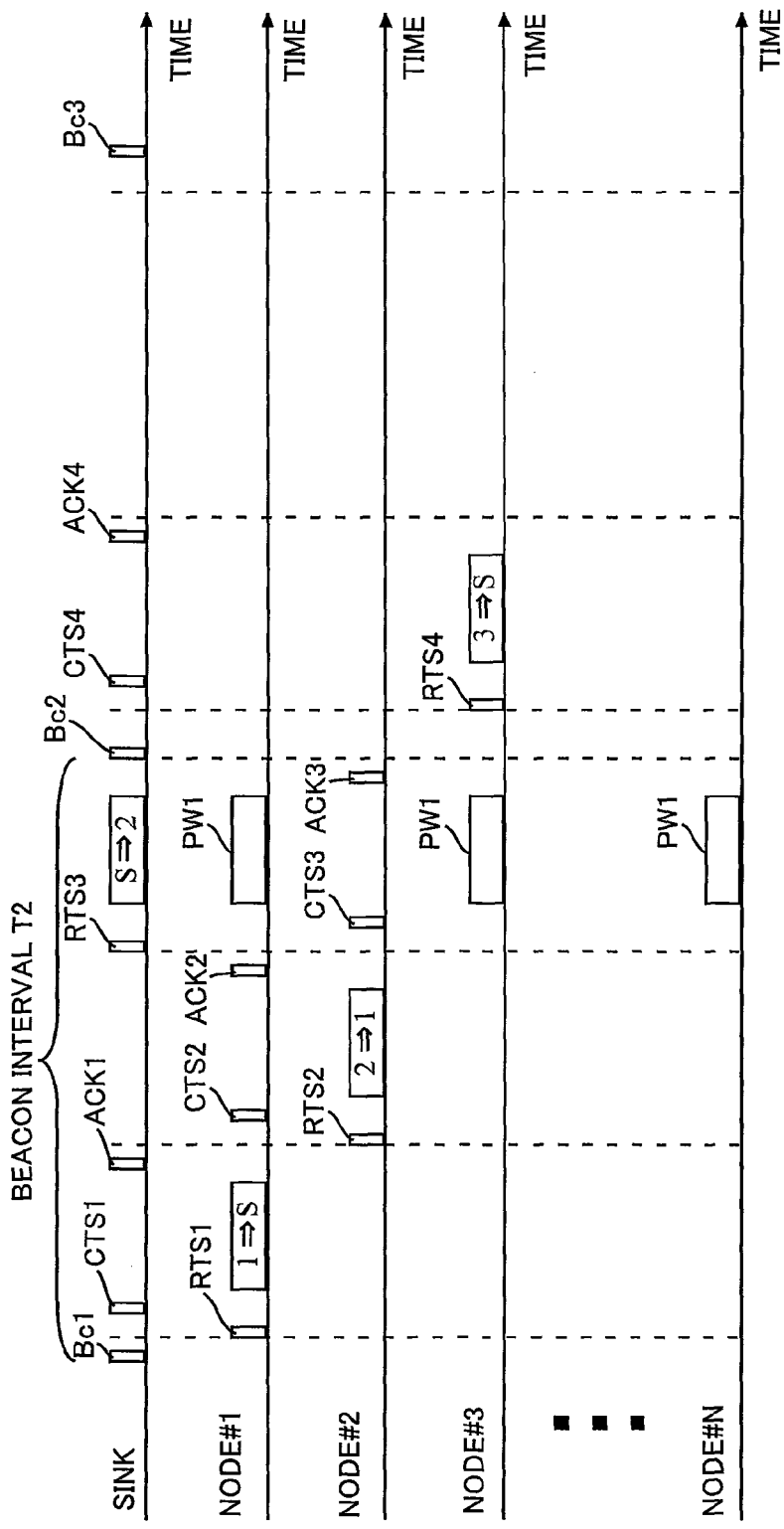
FIG. 8 is a timing chart for illustrating a communication method in the two-dimensional communication sheet shown in FIG. 7.

FIG. 8 is a timing chart for illustrating a communication method in the two-dimensional communication system 100 shown in FIG. 7. In the description in conjunction with FIG. 8, the communication device 10A shown in FIG. 7 is a sink and the communication devices 10B to 10G are nodes #1 to #N.

Referring to FIG. 8, beacons Bc1, Bc2, and Bc3 are generated in a cycle T2. When the beacon Bc1 is generated, the node #1 (for example, the communication device 10B) generates an RTS packet RTS1 and transmits the generated RTS packet RTS1 to the sink (communication device 10A) through the two-dimensional communication sheet 30 by the transmission wave wv2.

The sink (communication device 10A) receives the RTS packet RTS1 from the node #1 (communication device 10B) and detects that the RTS packet RTS1 is destined for itself by referring to the MAC header of the RTS packet RTS1. The sink (communication device 10A) generates a CTS packet CTS 1 corresponding to the RTS packet RTS1 and transmits the generated CTS packet CTS1 to the node #1 (communication device 10B) through the two-dimensional communication sheet 30 by the transmission wave wv2.

Upon receiving the CTS packet CTS1 from the sink (communication device 10A), the node #1 (communication device 10B) generates a data packet and transmits the generated data packet to the sink (communication device 10A) by the transmission wave wv2.

The sink (communication device 10A) receives the data packet from the node #1 (communication device 10B). The sink (communication device 10A) generates an ACK packet ACK1 in response to the reception of the data packet and transmits the generated ACK packet ACK1 to the node #1 (communication device 10B) by the transmission wave wv2. In this way, the transmission of the data packet from the node #1 (communication device 10B) to the sink (communication device 10A) is completed.

When the node #1 (communication device 10B) transmits the RTS packet RTS1 to the sink (communication device 10A), the nodes #2 to #N receive the RTS packet RTS1, detects the node #1 (communication device 10B) other than the sink (communication device 10A) as the source of the RTS packet RTS1 by referring to the MAC header of the RTS packet RTS1, and keeps the switch SW of the switch circuit 22 connected to the terminal 221. When the nodes #2 to #N receive a data packet from the node #1 (communication device 10B) and also when these nodes receive a CTS packet CTS1 and an ACK packet ACK1 from the sink (communication device 10A), the switch SW of the switch circuit 22 is kept connected to the terminal 221.

Then, the node #2 (for example, the communication device 10C) transmits a data packet to the node #1 (communication device 10B) by the same method. In this case, the node #2 (communication device 10C) generates an RTS packet RTS2 and a data packet and transmits the generated packets to the node #1 (communication device 10B) by the transmission wave wv2, and the node #1 (communication device 10B) receives the RTS packet RTS2 and the data packet, generates a CTS packet CTS2 and an ACK packet ACK2, and transmits the generated packets to the node #2 (communication device 10C) by the transmission wave wv2.

Then, the sink (communication device 10A) generates an RTS packet RTS3 and transmits the generated RTS packet RTS3 to the node #2 (communication device 10C) by the transmission wave wv2.

The nodes #1 to #N (communication devices 10B to 10G) receive the RTS packet RTS3 from the sink (communication device 10A). The nodes #1 and #3 to #N (communication devices 10B and 10D to 10G) detect the sink (communication device 10A) as the source of the RTS packet RTS3 and a device other than itself as the destination of the RTS packet RTS3 by referring to the MAC header of the RTS packet RTS3. The node #2 (communication device 10C) detects the sink (communication device 10A) as the source of the RTS packet RTS3 and itself as the destination of the RTS packet RTS3 by referring to the MAC header of the RTS packet RTS3.

Then, the node #2 (communication device 10C) generates a CTS packet CTS3 as a response packet to the RTS packet RTS3 and transmits the generated CTS packet CTS3 to the sink (communication device 10A) by the transmission wave wv2.

Upon receiving the CTS packet CTS3 from the node #2 (communication device 10C), the digital processing units 245 of the nodes #1 and #3 to #N (communication devices 10B and 10D to 10G) each generate a switch signal EX1 and outputs the generated switch signal EX1 to the switch circuit 22, and the switch circuit 22 switches the connection of the switch SW to the terminal 222 from the terminal 221 in response to the switch signal EX1.

Upon receiving the CTS packet CTS 3 from the node #2 (communication device 10C), the sink (communication device 10A) generates a data packet and transmits the generated data packet to the node #2 (communication device 10C) by the transmission wave wv1.

Upon receiving the data packet from the sink (communication device 10A), the node #2 (communication device 10C) carries out reception processing to the received data packet. More specifically, in the node #2 (communication device 10C), the connector 1 receives the transmission wave wv1 through the two-dimensional communication sheet 30 and outputs the received transmission wave wv1 to the switch circuit 22. The switch circuit 22 of the node #2 (communication device 10C) outputs the transmission wave wv1 received from the connector 1 to the attenuator 23 through the terminal 221, and the attenuator 23 attenuates the level of the transmission wave wv1 to an allowable level for the node #2 (communication device 10C) and outputs the wave to the amplifier 242.

Then, the amplifier 242 of the node #2 (communication device 10C) amplifies the transmission wave wv1 and outputs the amplified transmission wave wv1 to the A/D converter 244, and the A/D converter 244 converts the analog transmission wave wv1 received from the amplifier 242 into a digital signal and outputs the converted digital signal to the digital processing unit 245. The digital processing unit 245 of the node #2 (communication device 10C) decodes the digital signal and outputs the decoded signal to the computer 3, and the computer 3 receives the decoded digital signal from the digital processing unit 245. In this way, the node #2 (communication device 10C) receives the data packet transmitted from the sink (communication device 10A).

Meanwhile, the nodes #1 and #3 to #N (communication devices 10B and 10D to 10G) receive a data packet from the sink (communication device 10A) and stores the transmission wave wv1 forming the received data packet as power PW1. More specifically, in each of the nodes #1 and #3 to #N (communication devices 10B and 10D to 10G), the connector 1 receives the transmission wave wv1 through the two-dimensional communication sheet 30 and outputs the received transmission wave wv1 to the switch circuit 22. The switch circuit 22 in each of the nodes #1 and #3 to #N (communication devices 10B and 10D to 10G) outputs the transmission wave wv1 received from the connector 1 to the AC/DC converter 251 through the terminal 222. The AC/DC converter 251 converts the AC power of the transmission wave wv1 received from the switch circuit 22 into DC power PW1 and supplies the converted DC power PW1 to the energy storing device 252, and the energy storing device 252 stores the DC power PW1 received from the AC/CD converter 251.

Then, when the beacon Bc2 is generated, the node #3 (for example, the communication device 10D) transmits a data packet to the sink (communication device 10A) by the same method as the method described above. In this case, the node #3 (communication device 10D) generates an RTS packet RTS4 and a data packet and transmits the generated packets to the sink (communication device 10A) by the transmission wave wv2, and the sink (communication device 10A) receives the RTS packet RTS4 and the data packet, generates a CTS packet CTS4 and an ACK packet ACK4 and transmits the generated packets to the node #3 (communication device 10D) by the transmission wave wv2.

As described above, according to the first embodiment, the nodes #1 to #N (communication devices 10B to 10G) each receive a signal (control packet) and power (a data packet) transmitted at the same frequency f from the sink, process the received signal using the communication unit 24, and process the received power by the power receiving unit 25. More specifically, the nodes #1 to #N (communication devices 10B to 10G) each receive a signal and power transmitted at the same frequency f and carries out reception processing to the received signal and reception processing to the power independently from each other. As a result, the interference of the power reception processing upon the signal reception processing is reduced, so that the rise in the power receiving gain in the area where the signal receiving gain is low can be reduced.

Therefore, according to the present invention, the signal transmission performance can be prevented from being degraded while the signal reception and the power reception can be carried out.

According to the first embodiment, the nodes #1 to #N (communication devices 10B to 10G) each transmit/receive power and signals by one connector 1.

Therefore, the communication device can be reduced in size according to the present invention.

Furthermore, according to the first embodiment, when the sink (communication device 10A) is the source of a data packet, the nodes #1 and #3 to #N (communication devices 10B and 10D to 10G) excluding the destination of the data packet among the nodes #1 to #N other than the sink (communication device 10A) each store the data packet transmitted from the sink (communication device 10A) as the power PW1, and when any of the nodes #1 to #N (communication devices 10B to 10G) other than the sink (communication device 10A) is the source of a data packet, the nodes other than the sink (communication device 10A) that has received the data packet and the source of the data packet do not store the data packet as power.

Therefore, according to the present invention, when the sink transmits a data packet, the nodes other the destination of the data packet can receive power from the sink and can carry out communication using the received power. As a result, the energy can be preserved in the two-dimensional communication system 100.

Figure 9:
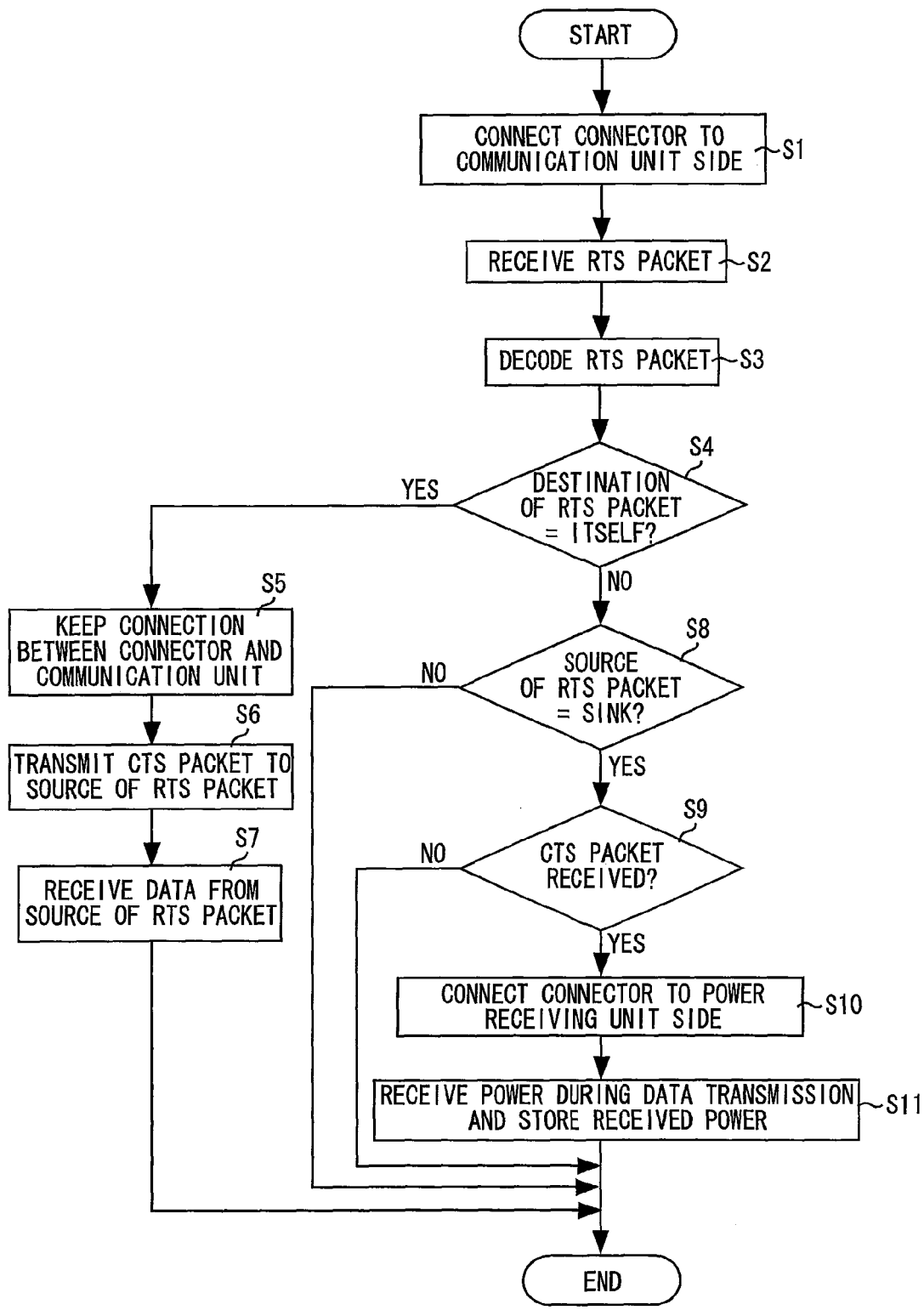
FIG. 9 is a flowchart for illustrating a communication method according to the first embodiment.

FIG. 9 is a flowchart for illustrating a communication method according to the first embodiment. Referring to FIG. 9, when a series of operation starts, the recharging switch 21 of the communication device 10 supplies the switch circuit 22 with power so that the circuit attains an operation state. The switch circuit 22 connects the switch SW to the terminal 221 and the connector 1 to the side of the communication unit 24 (step S1).

Then, the connector 1 receives an RTS packet through the two-dimensional communication sheet 30 (step S2) and outputs the received RTS packet to the switch circuit 22, and the switch circuit 22 outputs the RTS packet to the attenuator 23 through the terminal 221. Then, the attenuator 23 attenuates the level of the RTS packet to an allowable level for the communication device 10 and outputs the packet to the amplifier 242, and the amplifier 242 amplifies the RTS packet and outputs the amplified RTS packet to the A/D converter 244. The A/D converter 244 converts the RTS packet from the analog signal into a digital signal and outputs the converted digital signal to the digital processing unit 245.

Then, the digital processing unit 245 decodes the digital signal (step S3) and determines whether the RTS packet is destined for itself (step S4).

If it is determined in step S4 that the RTS packet is destined for itself, the digital processing unit 245 generates a hold signal HLD and outputs the generated hold signal HLD to the switch circuit 22. The switch signal 22 holds the connection of the switch SW to the terminal 221 in response to the hold signal HLD from the digital processing unit 245. More specifically, the connection between the connector 1 and the communication unit 24 is maintained (step S5).

Then, the digital processing unit 245 generates a CTS packet corresponding to the RTS packet and outputs the generated CTS packet to the switch circuit 22 through the D/A converter 243 and the amplifier 241. Then, the switch circuit 22 receives the CTS packet and outputs the received CTS packet to the connector 1, and the connector 1 transmits the CTS packet. In this way, the CTS packet is transmitted to the source of the RTS packet (step S6).

Then, the connector 1 receives the data packet from the source of the RTS packet and outputs the received data packet to the communication unit 24 through the switch circuit 22 and the attenuator 23, and the communication unit 24 converts the data packet from the analog signal into a digital signal, decodes the converted digital signal, and outputs the signal to the computer 3. In this way, the data transmitted from the source of the RTS packet is received (step S7).

If it is determined in step S4 that the RTS packet is not destined for itself, the digital processing unit 245 further determines whether the source of the RTS packet is the sink (step S8).

If it is determined in step S8 that the source of RTS packet is the sink, the digital processing unit 245 further determines whether a CTS packet has been received (step S9).

If it is determined in step S9 that a CTS packet has been received, the digital processing unit 245 generates a switch signal EX1 and outputs the signal to the switch circuit 22, and the switch circuit 22 switches the connection of the switch SW from the terminal 221 to the terminal 222 in response to the switch signal EX1 from the digital processing unit 245. In this way, the connector 1 is connected to the side of the power receiving unit 25 (step S10).

The connector 1 then receives the data packet transmitted from the sink and outputs the packet to the power receiving unit 25, and the power receiving unit 25 stores the transmission wave wv1 forming the data packet as power. More specifically, the power receiving unit 25 receives power during data transmission and stores the received power (step S11).

After step S7, if it is determined in step S8 that the source of the RTS packet is not the sink and if it is determined in step S9 that a CTS packet has not been received, the series of operation ends.

As described above, upon receiving the RTS packet, if the destination of the RTS is not itself, the source of the RTS packet is the sink, and a CTS packet corresponding to the RTS packet is received from another communication device (see "NO" in step S4, followed by "YES" in step S8, and then "YES" in step S9), the communication device 10 switches the connection of the connector 1 from the communication unit 24 to the side of the power receiving unit 25 and stores power transmitted from the sink (see steps S10 and S11).

Therefore, each of the communication devices can store a data packet transmitted from the sink and not destined for itself as power. As a result, the energy can be preserved in the two-dimensional communication system 100.

According to the first embodiment, the single connector 1 receives both the transmission wave wv1 used to transmit power and the transmission wave wv2 used to transmit a control packet such as an RTS packet, the received power (i.e., the transmission wave wv1) is processed by the power receiving unit 25, and the received signal (i.e., the transmission wave wv2) is processed by the communication unit 24. The transmission waves wv1 and wv2 have the same transmission frequency. More specifically, the power and the signal have the same frequency and are received by the single connector and processed independently from each other.

Therefore, the interference of the power reception processing upon the signal reception processing can be reduced, so that the signal and power can be communicated while the degradation in the signal transmission performance is reduced.

Note that according to the present invention, the sink may transmit only the transmission wave wv1 storable as power that does not form a data packet, and the nodes #1 to #N may receive the transmission wave wv1 transmitted from the sink and store it as power.

According to the present invention, if there is no longer a data packet to be transmitted to a destination while the sink communicates with any of the nodes #1 to #N, the sink transmits only the transmission wave wv1 storable as power that does not form a data packet until the beacon interval ends, and the nodes #1 to #N may receive the transmission wave wv1 transmitted from the sink and store it as power.

Second Embodiment

Figure 10:
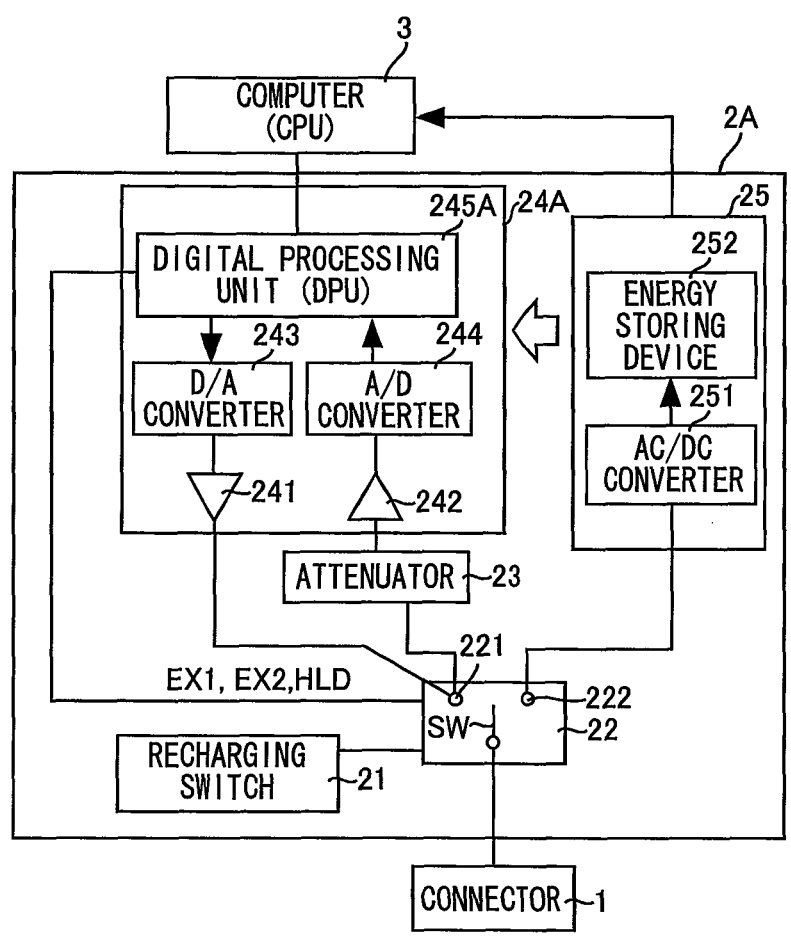
FIG. 10 is a schematic block diagram of the configuration of a communication device according to a second embodiment of the present invention.

FIG. 10 is a schematic block diagram of the configuration of a communication device according to a second embodiment of the present invention. Referring to FIG. 10, the communication device 110 according to the second embodiment is different from the communication device 10 shown in FIG. 1 in that the interface device 2 is replaced by an interface device 2A, and the other structure is the same as that of the communication device 10.

The interface device 2A has a communication unit 24A instead of the communication unit 24 of the interface device 2 shown in FIG. 1, and the other structure is the same as that of the communication unit 24.

The communication unit 24A has a digital processing unit 245A instead of the digital processing unit 245 of the communication unit 24 shown in FIG. 1, and the other structure is the same as that of the communication unit 24.

The digital processing unit 245A generates a switch signal EX1 used to switch the connection of the switch SW from the terminal 221 to the terminal 222 if there is no packet to be transmitted or received and outputs the generated signal to the switch circuit 22. If there is a data packet to be transmitted or received, the digital processing unit 245A generates a switch signal EX2 used to switch the connection of the switch SW from the terminal 222 to the terminal 221 and outputs the generated signal to the switch circuit 22.

Apart from the above, the digital processing unit 245A has the same function as that of the digital processing unit 245.

Figure 11:
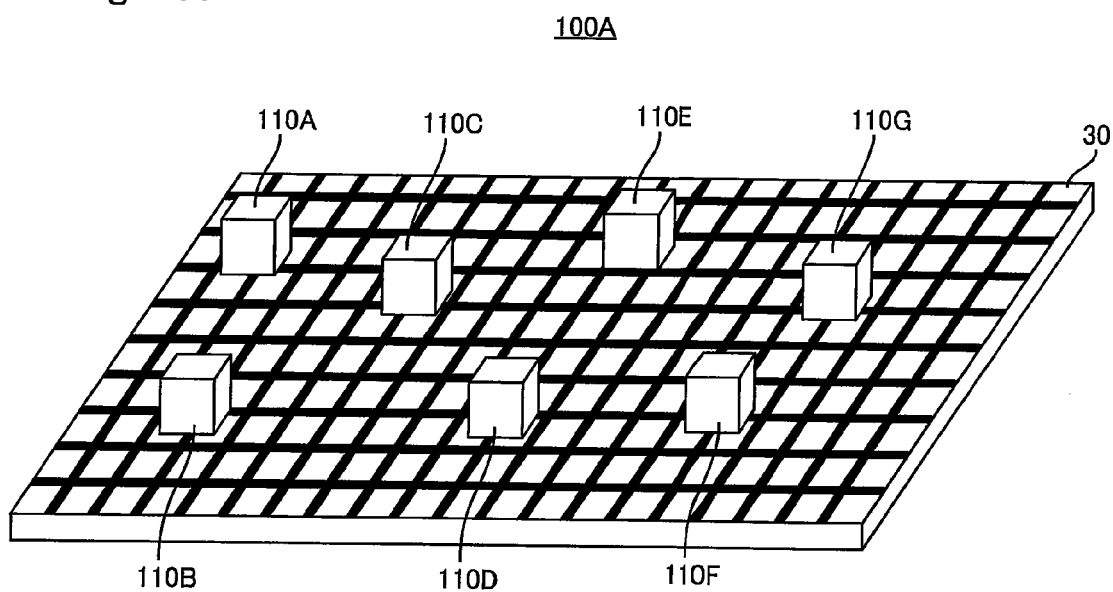
FIG. 11 is a schematic diagram of a two-dimensional communication system using the communication device shown in FIG. 10.

FIG. 11 is a schematic diagram of a two-dimensional communication system using the communication device 110 shown in FIG. 10. Referring to FIG. 11, the two-dimensional communication system 100A includes a two-dimensional communication sheet 30 and communication devices 110A, 110B, 110C, 110D, 110E, 110F, and 110G.

The communication devices 110A, 110B, 110C, 110D, 110E, 110F, and 110G each consist of the communication device 110 shown in FIG. 10. The communication devices 110A, 110B, 110C, 110D, 110E, 110F, and 110G are provided on the surface of the two-dimensional communication sheet 30 (the surface on the side of the conductor 32). In this case, the communication device 110A for example is a sink and the communication devices 110B, 110C, 110D, 110E, 110F, and 110G are nodes used to receive power from the sink (communication device 110A) and store the received power.

According to the second embodiment, the communication devices 110B, 110C, 110D, 110E, 110F, and 110 other than the sink (communication device 110A) receive and store power transmitted from the sink (communication device 110A) when they do not carry out communication and use the stored power when they carry out communication.

Figure 12:
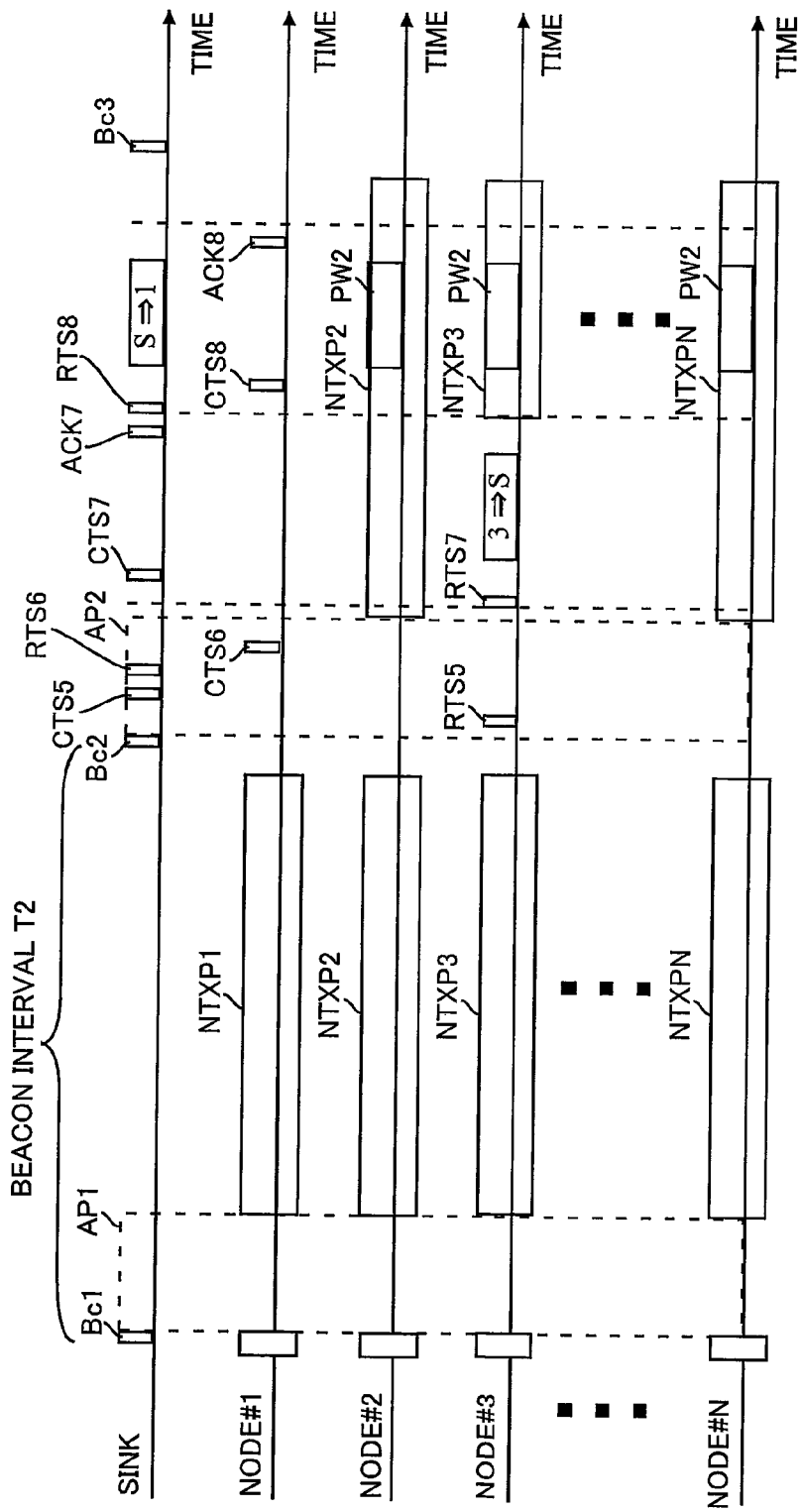
FIG. 12 is a timing chart for illustrating a communication method in the two-dimensional communication system shown in FIG. 11.

FIG. 12 is a timing chart for illustrating a communication method in the two-dimensional communication system 100A shown in FIG. 11. Note that in the description in conjunction with FIG. 12, the communication device 110A in FIG. 11 is a sink and the communication devices 110B to 110G are nodes #1 to #N.

Referring to FIG. 12, beacons Bc1, Bc2, and Bc3 are generated in a cycle T2. When the beacon Bc1 is generated, an announce period AP1 is generated. When the sink and the nodes #1 to #N (communication devices 110A to 110G) start communication, a control packet (such as an RTS packet) used to start the communication is transmitted and received in the announce period.

In the case shown in FIG. 12, none of the sink and the nodes #1 to #N (communication devices 110A to 110G) transmits a control packet in the announce period AP1, and therefore the nodes #1 to #N (communication devices 110B to 110G) have transmission stop periods NTXP1 to NTXPN, respectively. During the transmission stop periods, no signal can be transmitted but power can be received.

After the transmission stop periods NTXP1 to NTXPN, when the beacon Bc2 is generated and an announce period AP2 starts, the node #3 (communication device 110D) generates an RTS packet RTS5 and transmits the generated RTS packet RTS5 to the sink (communication device 110A) by the transmission wave wv2 through the two-dimensional communication sheet 30.

The sink (communication device 110A) receives the RTS packet RTS5 from the node #3 (communication device 110D) and detects itself as the destination of the RTS packet RTS5 by referring to the MAC header of the received RTS packet RTS5. The sink (communication device 110A) generates a CTS packet CTS5 corresponding to the RTS packet RTS5 and transmits the CTS packet CTS5 to the node #3 (communication device 110D) by the transmission wave wv2 through the two-dimensional communication sheet 30. In this case, the nodes #1, #2, and #4 to #N (communication devices 110B, 110C, and 110E to 110G) detect that the RTS packet RTS5 is not destined for them by referring to the MAC header of the RTS packet RTS5.

Then, the sink (communication device 110A) generates an RTS packet RTS 6 and transmits the generated RTS packet RTS6 to the node #1 (communication device 110B) through the two-dimensional communication sheet 30.

The node #1 (communication device 110B) receives the RTS packet RTS6 from the sink (communication device 110A) and detects itself as the destination of the RTS packet RTS6 by referring to the MAC header of the RTS packet RTS6. Then, the node #1 (communication device 110B) generates a CTS packet CTS6 as a response to the received RTS packet RTS6 and transmits the generated CTS packet CTS6 to the sink (communication device 110A). In this case, the nodes #2 to #N (communication devices 110C to 110G) detect that the RTS packet RTS6 is not destined for them by referring to the MAC header of the RTS packet RTS6.

In this way, in the announce period AP2, the RTS packets RTS5 and RTS6, and CTS packets CT5 and CTS6 are transmitted and received, so that the sink and all the nodes #1 to #N (communication devices 110A to 110G) detect communication to be carried out between the node #3 (communication device 110D) and the sink (communication device 110A) and between the sink (communication device 110A) and the node #1 (communication device 110B) after the announce period AP2. After the announce period AP2, the nodes #2 and #4 to #N connect the switch circuit SW of the switch circuit 22 to the terminal 222, so that transmission stop periods NTXP2 and NTXP4 to NTXPN are started. When its own communication ends, the node #3 (communication device 110D) connects the switch SW of the switch circuit 22 to the terminal 222 and a transmission stop period NTXP3 is started.

After the announce period AP2, the node #3 (communication device 110D) generates RTS packet RTS7 in order to actually transmit a data packet to the sink (communication device 110A) and transmits the generated RTS packet RTS7 to the sink (communication device 110A) by the transmission wave wv2 through the two-dimensional communication sheet 30.

The sink (communication device 110A) receives the RTS packet RTS7 from the node #3 (communication device 110D) and detects that the RTS packet RTS7 is destined for itself by referring to the MAC header of the received RTS packet RTS7. The sink (communication device 110A) generates a CTS packet CTS7 corresponding to the RTS packet RTS7 and transmits the generated CTS packet CTS7 to the node #3 (communication device 110D) by the transmission wave wv2 through the two-dimensional communication sheet 30.

Upon receiving the CTS packet CTS7 from the sink (communication device 110A), the node #3 (communication device 110D) generates a data packet and transmits the generated data packet to the sink (communication device 110A) by the transmission wave wv2.

The sink (communication device 110A) receives the data packet from the node #3 (communication device 110D). The sink (communication device 110A) generates an ACK packet ACK7 in response to the reception of the data packet and transmits the generated ACK packet ACK7 to the node #3 (communication device 110D) by the transmission wave wv2. In this way, the transmission of the data packet from the node #3 (communication device 110D) to the sink (communication device 110A) is completed.

Note that when the node #3 (communication device 110D) transmits the RTS packet RTS7 to the sink (communication device 110A), the nodes #1, #2, and #4 to #N (communication devices 110B, 110C and 110E to 110G) also receive the RTS packet RTS7 but do not store the RTS packet RTS7 as power because the RTS packet RTS7 is transmitted by the transmission wave wv2 that does not have energy as electric power. This also applies when the sink (communication device 110A) transmits the CTS packet CTS7.

Then, the sink (communication device 110A) generates an RTS packet RTS8 and transmits the generated RTS packet RTS8 to the node #1 (communication device 110B) by the transmission wave wv2.

The node #1 (communication device 110B) receives the RTS packet RTS8 from the sink (communication device 110A). The node #1 (communication device 110B) refers to the MAC header of the received RTS packet RTS8 and detects that the RTS packet RTS8 is destined for itself. Then, the node #1 (communication device 110B) generates a CTS packet CTS8 as a response packet to the RTS packet RTS8 and transmits the generated CTS packet CTS8 to the sink (communication device 110A) by the transmission wave wv2.

Upon receiving the CTS packet CTS8 from the node #1 (communication device 110B), the sink (communication device 110A) generates a data packet and transmits the generated data packet to the node #1 (communication device 110B) by the transmission wave wv1.

The node #1 (communication device 110B) receives the data packet from the sink (communication device 110A) and carries out reception processing to the received data packet. More specifically, at the node #1 (communication device 110B), the connector 1 receives the transmission wave wv1 through the two-dimensional communication sheet 30 and outputs the received transmission wave wv1 to the switch circuit 22. The switch circuit 22 of the node #1 (communication device 110B) outputs the transmission wave wv1 received from the connector 1 to the attenuator 23 through the terminal 221, and the attenuator 23 attenuates the level of the transmission wave wv1 to the level of node #1 (communication device 110B) and outputs the wave to the amplifier 242.

Then, the amplifier 242 of the node #1 (communication device 110B) amplifies the transmission wave wv1 and outputs the amplified transmission wave wv1 to the A/D converter 244, and the A/D converter 244 converts the transmission wave wv1 received from the amplifier 242 from the analog signal into a digital signal and outputs the converted digital signal to the digital processing unit 245. The digital processing unit 245 of the node #1 (communication device 110B) decodes the digital signal and outputs the signal to the computer 3, and the computer 3 receives the decoded digital signal from the digital processing unit 245. In this way, the node #1 (communication device 110B) receives the data packet transmitted from the sink (communication device 110A).

Meanwhile, the nodes #2 to #N (communication devices 110C to 110G) also receive a data packet from the sink (communication device 110A) and store the transmission wave wv1 of the received packet as power PW2. More specifically, in each of the nodes #2 to #N (communication devices 110C to 110G), the connector 1 receives the transmission wave wv1 through the two-dimensional communication sheet 30 and outputs the received transmission wave wv1 to the switch circuit 22. The switch circuit 22 in each of the nodes #2 to #N (communication devices 110C to 110G) outputs the transmission wave wv1 received from the connector 1 to the AC/DC converter 251 through the terminal 222, and the AC/DC converter 251 converts the AC power of the transmission wave wv1 received from the switch circuit 22 into DC power PW2 and supplies the converted DC power PW2 to the energy storing device 252. The energy storing device 252 stores the DC power PW2 received from the AC/DC converter 251.

As described above, according to the second embodiment, when the sink (communication device 110A) is the source of a data packet, the nodes #2 to #N (communication devices 110C to 110G) that do not carry out communication among the nodes #1 to #N other than the sink (communication device 110A) store the data packet transmitted from the sink (communication device 110A) as power PW2, and when any of the nodes #1 to #N (communication devices 110B to 110G) other than the sink (communication device 110A) is the source of a data packet, the sink (communication device 110A) and the node that have received the data packet do not store the data packet as power.

Therefore, according to the present invention, when the sink transmits a data packet, the nodes that do not carry out communication can receive power from the sink and carry out communication using the received power. As a result, the energy can be preserved in the two-dimensional communication system 100.

According to the second embodiment, the same effects as those of the first embodiment can be provided in addition to the above.

Figure 13:
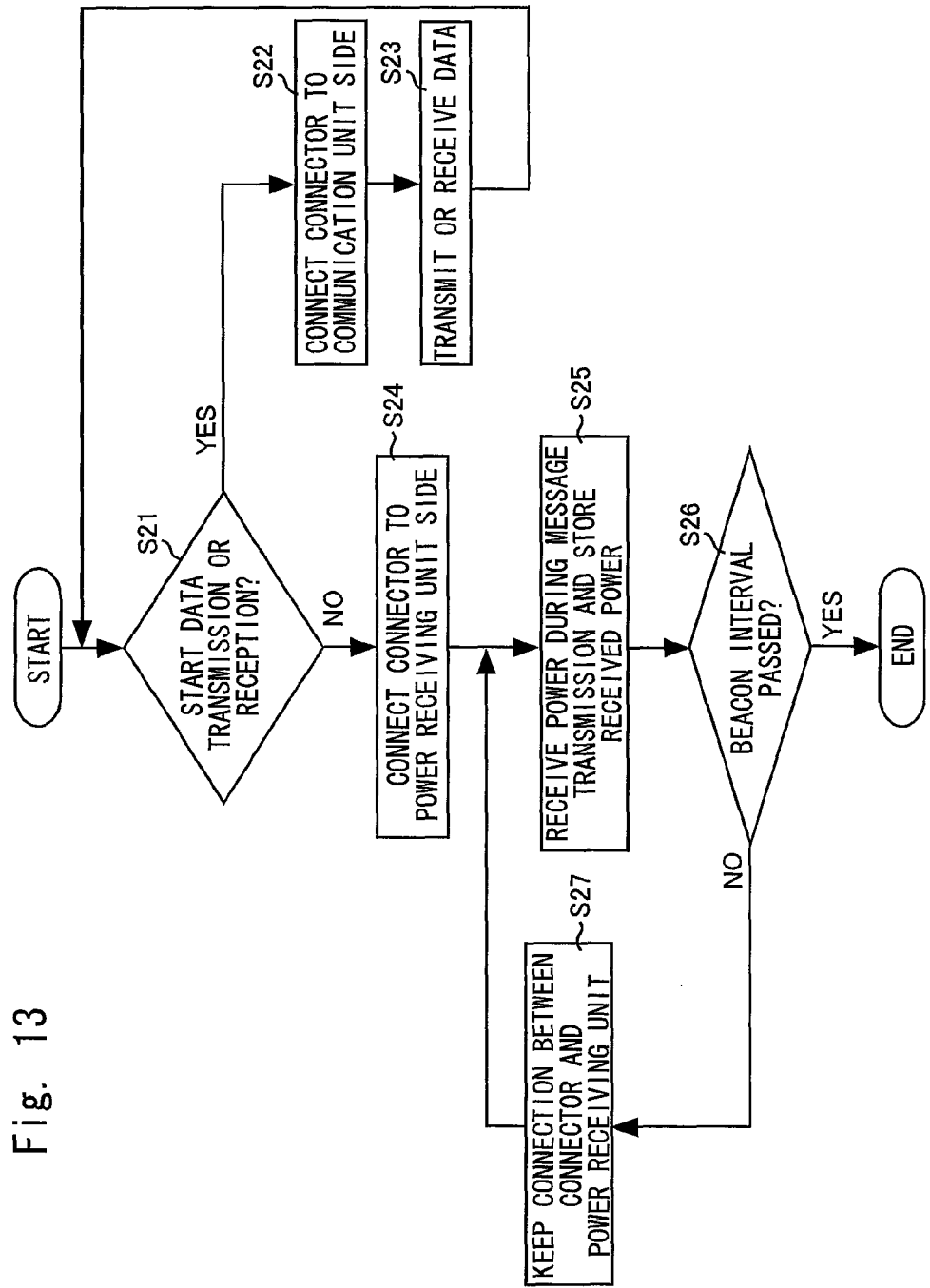
FIG. 13 is a flowchart for illustrating a communication method in the second embodiment.

FIG. 13 is a flowchart for illustrating a communication method according to the second embodiment. Referring to FIG. 13, when a series of operation starts, in each of the communication devices 110, the digital processing unit 245 of the communication unit 24 determines whether or not to start data transmission or reception (step S21). More specifically, the digital processing unit 245 determines whether or not to start the data transmission or reception based on whether an RTS packet or a CTS packet is transmitted or received in an announce period AP.

If it is determined in step S21 that the data transmission or reception is to be started, the digital processing unit 245 generates a switch signal EX2 and outputs the signal to the switch circuit 22, and the switch circuit 22 switches the connection of the switch SW from the terminal 222 to the terminal 221 in response to the switch signal EX2. More specifically, the connector 1 is connected to the side of the communication unit 24 (step S22).

Then, the digital processing unit 245 receives power from the energy storing device 252 and transmits or receives data (step S23). Then, the series of operation returns to the step S21.

On the other hand, if it is determined in step S21 that the data transmission or reception is not to be started, the digital processing unit 245 generates a switch signal EX1 and outputs the signal to the switch circuit 22, and the switch circuit 22 switches the connection of the switch SW from the terminal 221 to the terminal 222 in response to the switch signal EX1. More specifically, the connector 1 is connected to the side of the power receiving unit 25 (step S24).

The connector 1 receives the power (transmission wave wv1) during the transmission of a message (data packet) and outputs the received power to the AC/DC converter 251 through the switch circuit 22, and the AC/DC converter 251 converts the AC power from the connector 1 into DC power and supplies the energy storing device 252 with the converted DC power. The energy storing device 252 stores the supplied power (step S25).

Then, the digital processing unit 245 determines whether the beacon interval has passed (step S26). If it is determined in step S26 that the beacon interval has not passed, the connection between the connector 1 and the power receiving unit 25 is maintained (step S27) and then the series of operation returns to step S25.

Then, the above-described steps S25 to S27 are repeatedly carried out until it is determined in step S26 that the beacon interval has passed. If it is determined in step S26 that the beacon interval has passed, the series of operation ends.

The flowchart in FIG. 13 is repeated every time a new beacon is generated.

According to the second embodiment, the communication device 110 stores data transmitted from the sink as power if it does not carry out communication (see "NO" in step 21 and steps S24 and S25) and uses the stored power when it carries out communication (see steps S22 and S23).

Therefore, according to the present invention, the energy can be preserved in the two-dimensional communication system 100A.

In the sensor system, a plurality of sensors are not always in an on state and stopped for each prescribed period. Therefore, when the plurality of communication devices 110A to 110G of the two-dimensional communication system 100A are provided in the sink and the sensors in the sensor system, power can be supplied from the sink to the sensors in an operation stopped state, so that the energy in the sensor system can be preserved. More specifically, the two-dimensional communication system 100A according to the second embodiment is a two-dimensional communication system suitable for a sensor system.

The other structure is the same as that of the first embodiment.

Third Embodiment

Figure 14:
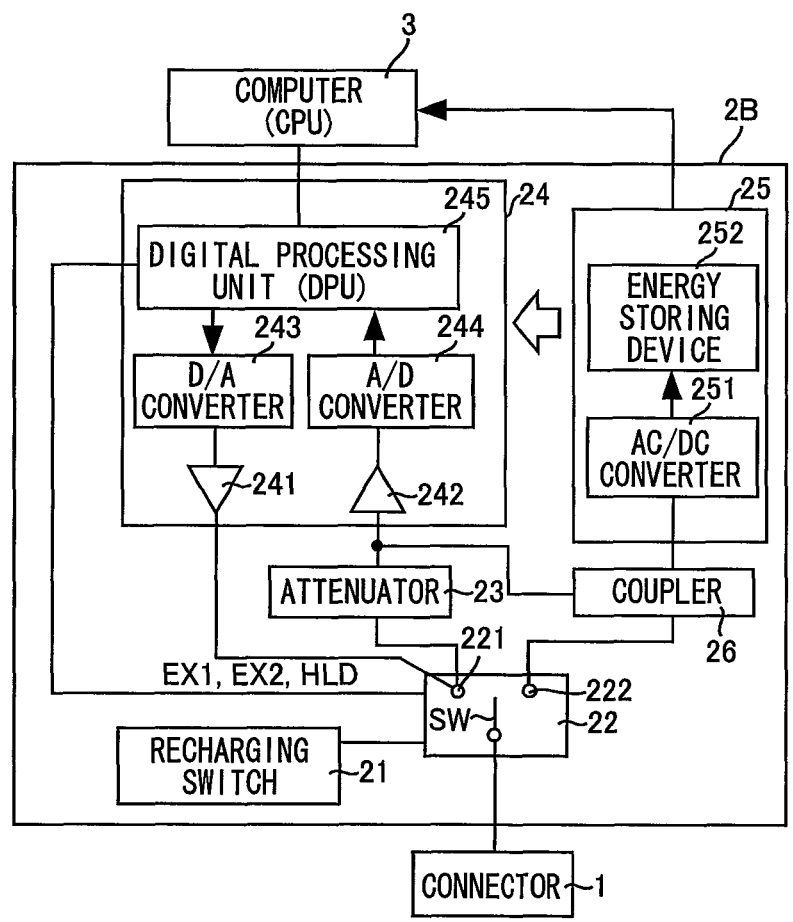
FIG. 14 is a schematic block diagram showing the configuration of a communication device according to a third embodiment of the present invention.

FIG. 14 is a schematic block diagram of the configuration of a communication device according to a third embodiment of the present invention. Referring to FIG. 14, a communication device 120 according to the third embodiment includes an interface device 2B instead of the interface device 2 in the communication device 10 shown in FIG. 1, and the other structure is the same as that of the communication device 10.

The interface device 2B additionally includes a coupler 26 as compared to the interface device 2 shown in FIG. 1, and the other structure is the same as that of the interface device 2.

The coupler 26 is provided between the terminal 222 of the switch circuit 22 and the amplifier 242 and the AC/DC converter 251. The coupler 26 separates a transmission wave wv3 received from the switch circuit 22 into a signal and power by the following method, and outputs the separated signal to the communication unit 24 (amplifier 242) and the separated power to the power receiving unit 25 (AC/DC converter 251).

Figure 15:
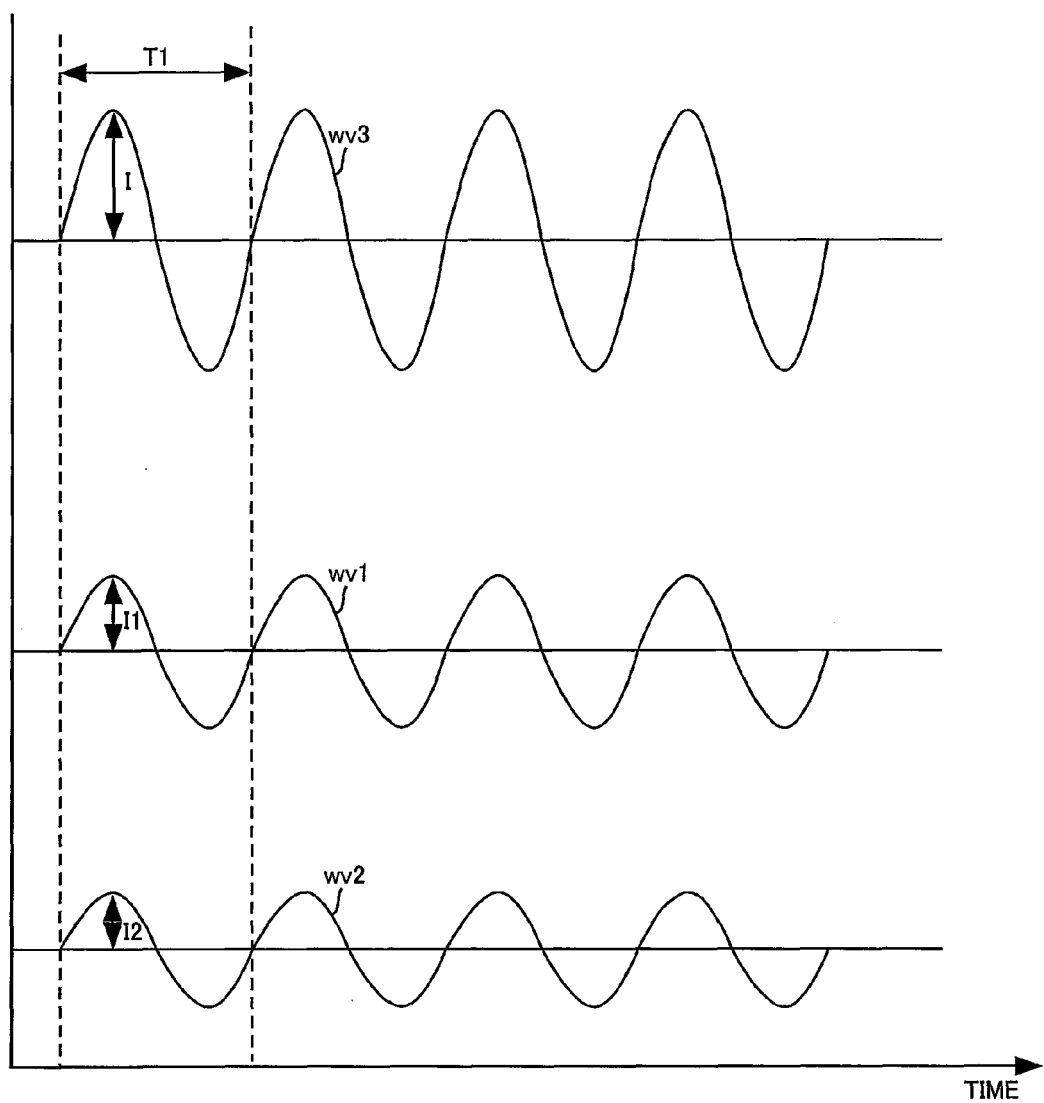
FIG. 15 is a diagram for illustrating a method of separating a transmission wave into a signal and power.

FIG. 15 is a chart for illustrating the method of separating the transmission wave wv3 into the signal and the power. Referring to FIG. 15, the communication device 120 as a sink generates the transmission wave wv3 produced by superposing the transmission wave wv2 forming the signal on the transmission wave wv1 forming the power and transmits the generated transmission wave. The transmission waves wv1 and wv2 have the same transmission frequency $f\ (=1/T1)$ as described above, and therefore the transmission wave wv2 can be superposed easily on the transmission wave wv1.

The coupler 26 of the communication device 120 prestores the amplitude I1 of the transmission wave wv1 and the amplitude I2 of the transmission wave wv2, detects the amplitude I of the transmission wave wv3 received from the connector 1 and internally divides the detected amplitude I in the ratio of the amplitudes I1 and I2 to obtain the amplitudes of the power and the signal. The coupler 26 then separates the transmission wave wv3 into two transmission waves wv1 and wv2 having the obtained amplitudes. In this way, the transmission wave wv3 can be separated into the signal and the power.

Figure 16:
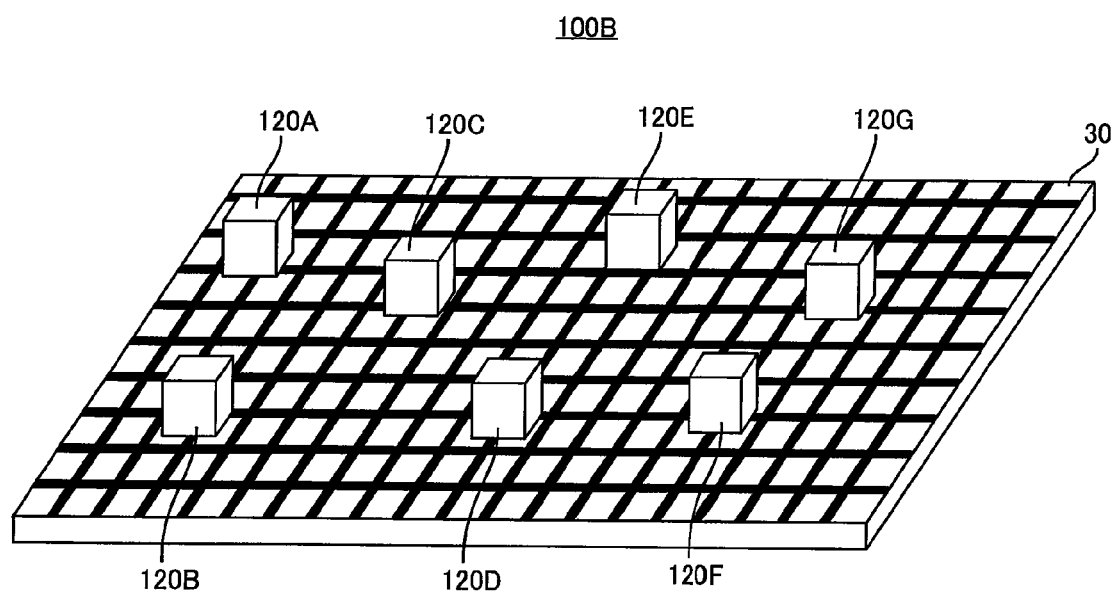
FIG. 16 is schematic view of a two-dimensional communication system using the communication device shown in FIG. 14.

FIG. 16 is a schematic view of a two-dimensional communication system using the communication device 120 shown in FIG. 14. Referring to FIG. 16, the two-dimensional communication system 100B includes a two-dimensional communication sheet 30 and communication devices 120A, 120B, 120C, 120D, 120E, 120F, and 120G.

The communication devices 120A, 120B, 120C, 120D, 120E, 120F, and 120G each consist of the communication device 120 shown in FIG. 14. The communication devices 120A, 120B, 120C, 120D, 120E, 120F, and 120G are provided on the surface of the two-dimensional communication sheet 30 (the surface on the side of the conductor 32). In this case, the communication device 120A for example is a sink and the communication devices 120B, 120C, 120D, 120E, 120F, and 120G are nodes that receive power from the sink (communication device 120A) and store the received power.

According to the third embodiment, the sink (communication device 120A) transmits signals (control and data packets) and power by the transmission wave wv3, the nodes (communication devices 120B to 120G) other than the sink (communication device 120A) transmit signals (control and data packets) by the transmission wave wv2. Upon receiving the transmission wave wv3 from the sink (communication device 120A), the communication devices 120B, 120C, 120D, 120E, 120F, and 120G other than the sink (communication device 120A) each connect the connector 1 to the side of the coupler 26, and upon receiving the transmission wave wv2 from a node other than the sink (communication device 120A), each communication device connects the connector 1 to the side of the communication unit 24.

Figure 17:
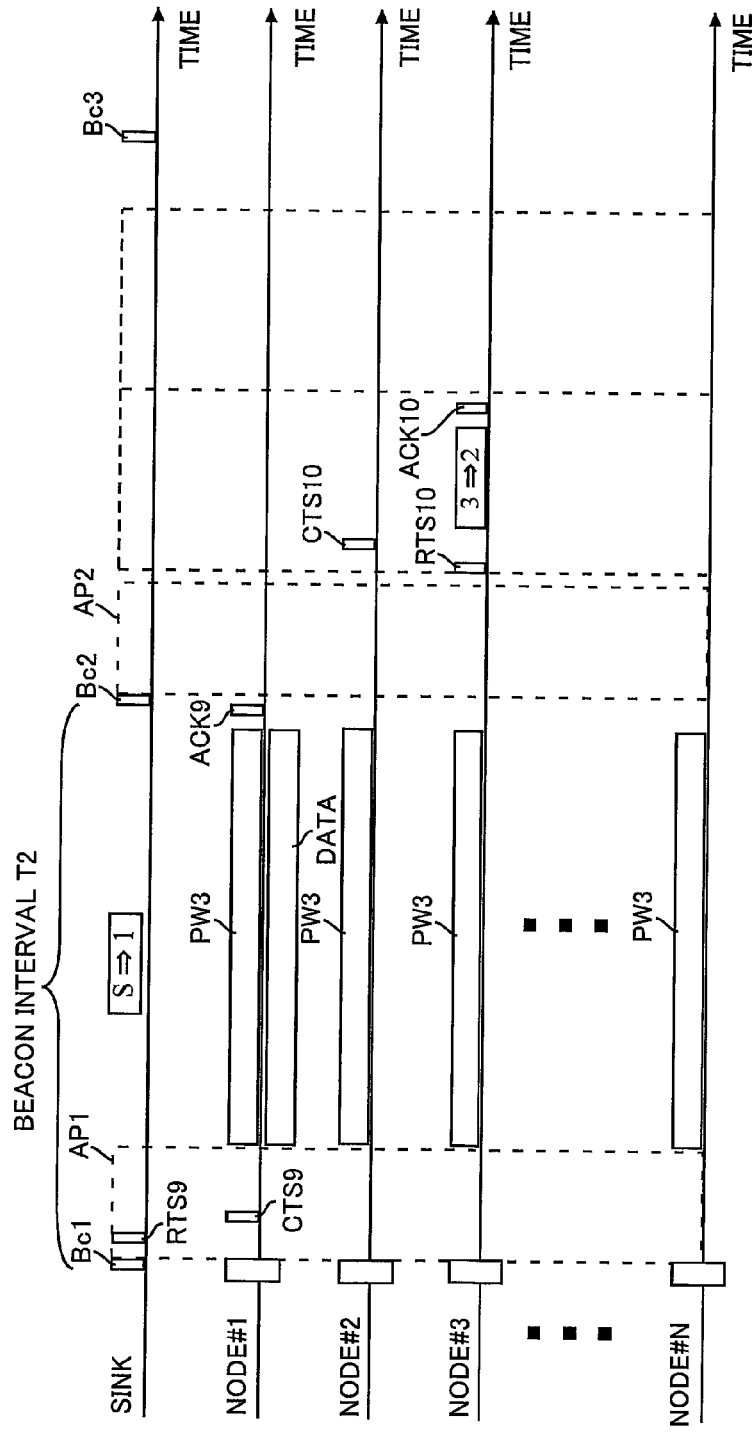
FIG. 17 is a timing chart for illustrating a communication method in the two-dimensional communication system shown in FIG. 16.

FIG. 17 is a timing chart for illustrating a communication method in the two-dimensional communication system 100B shown in FIG. 16. In the description in conjunction with FIG. 17, the communication device 120A shown in FIG. 16 is a sink and the communication devices 120B to 120G are nodes #1 to #N.

Referring to FIG. 17, beacons Bc1, Bc2, and Bc3 are generated in a cycle T2. When the beacon Bc1 is generated, the sink (communication device 120A) generates an RTS packet RTS9 and transmits the generated RTS packet RTS9 by the transmission wave wv2 through the two-dimensional communication sheet 30 in an announce period AP1.

The nodes #1 to #N (communication devices 120B to 120G) receive the RTS packet RTS9 from the sink (communication device 120A) and analyzes the received RTS packet RTS9. More specifically, in each of the nodes #1 to #N (communication devices 120B to 120G), the switch SW of the switch circuit 22 is connected to the terminal 221, and the connector 1 receives the RTS packet RTS9 from the sink (communication device 120A) through the two-dimensional communication sheet 30 and outputs the received RTS packet RTS9 to the attenuator 23 through the switch circuit 22.

In each of the nodes #1 to #N (communication devices 120B to 120G), the attenuator 23 attenuates the level of the RTS packet RTS9 to an allowable level for the nodes #1 to #N (communication devices 120B to 120G) and outputs the packet to the communication unit 24, and the amplifier 242 in the communication unit 24 amplifies the RTS packet RTS9 and outputs the amplified packet to the A/D converter 244.

In each of the nodes #1 to #N (communication devices 120B to 120G), the A/D converter 244 converts the RTS packet RTS9 from the analog signal into a digital signal and outputs the converted digital signal to the digital processing unit 245.

In each of the nodes #1 to #N (communication devices 120B to 120G), the digital processing unit 245 refers to the MAC header of the RTS packet RTS9 and detects that the source of the RTS packet RTS9 is the sink (communication device 120A).

Then, in each of the nodes #2 to #N (communication devices 120C to 120G), the digital processing unit 245 generates a switch signal EX1 and outputs the signal to the switch circuit 22, and the switch circuit 22 switches the connection of the switch SW from the terminal 221 to the terminal 222 in response to the switch signal EX1 from the digital processing unit 245. In each of the nodes #2 to #N (communication devices 120C to 120G), the digital processing unit 245 outputs the RTS packet RTS9 to the computer 3. In each of the nodes #2 to #N (communication devices 120C to 120G), the computer 3 refers to the MAC header of the RTS packet RTS9 and detects that the RTS packet RTS9 is not destined for itself.

The digital processing unit 245 of the node #1 (communication device 120B) outputs the RTS packet RTS9 to the computer 3. The computer 3 of the node #1 (communication device 120B) detects itself as the destination of the RTS packet RTS9 by referring to the MAC header of the RTS packet RTS9, generates a CTS packet CTS9 as a response packet to the RTS packet RTS9, and outputs the generated CTS packet CTS9 to the digital processing unit 245.

Upon receiving the CTS packet CTS9 from the computer 3, the digital processing unit 245 of the node #1 (communication device 120B) outputs the received CTS packet CTS9 to the connector 1 through the D/A converter 243, the amplifier 241, and the switch circuit 22, and the connector 1 transmits the CTS packet CTS9.

Then, the digital processing unit 245 of the node #1 (communication device 120B) generates a switch signal EX1 and outputs the generated signal to the switch circuit 22, and the switch circuit 22 switches the connection of the switch SW from the terminal 221 to the terminal 222 in response to the switch signal EX1 from the digital processing unit 245.

The sink (communication device 120A) generates a data packet upon receiving the CTS packet CTS9 from the node #1 (communication device 120B) and transmits the generated data packet by the transmission wave wv3 through the two-dimensional communication sheet 30.

In each of the nodes #1 to #N (communication devices 120B to 120G), the connector 1 receives the transmission wave wv3 transmitted from the sink (communication device 120A) and outputs the received transmission wave wv3 to the coupler 26 through the switch circuit 22.

In this way, in each of the nodes #1 to #N (communication devices 120B to 120G), the coupler 26 separates the transmission wave wv3 into the transmission wave wv1 and the transmission wave wv2 by the method described above, outputs the separated transmission wave wv1 to the power receiving unit 25 and the separated transmission wave wv2 to the communication unit 24.

The communication unit 24 of the node #1 (communication device 120B) amplifies the transmission wave wv2, converts the analog signal into a digital signal, decodes the converted digital signal, and outputs the decoded signal to the computer 3.

Then, the computer 3 of the node #1 (communication device 120B) receives the digital signal from the communication unit 24 and data DATA transmitted from the sink (communication device 120A). The computer 3 of the node #1 (communication device 120B) generates an ACK packet ACK9 and transmits the generated packet to the sink (communication device 120A).

The power receiving unit 25 of the node #1 (communication device 120B) converts the AC power of the transmission wave wv1 into DC power PW3 and stores the converted DC power PW3.

Meanwhile, in each of the nodes #2 to #N (communication devices 120C to 120G) other than the destination of the data packet, the communication unit 24 converts the transmission wave wv2 from the analog signal into a digital signal, decodes the converted digital signal, and outputs the decoded digital signal to the computer 3.

In this way, in each of the nodes #2 to #N (communication devices 120C to 120G), the computer 3 receives the digital signal from the communication unit 24 and discards the received digital signal since the data packet transmitted from the sink (communication device 120A) is not destined for itself.

In each of the nodes #2 to #N (communication devices 120C to 120G), the power receiving unit 25 converts the transmission wave wv1 from the AC power to DC power PW3 and stores the converted DC power PW3.

Then, when the beacon Bc2 is generated and the announce period AP2 passes, in the sink and all the nodes #1 to #N (communication devices 120A to 120G), the digital processing unit 245 generates a switch signal EX2 and outputs the generated signal to the switch circuit 22, and the switch circuit 22 switches the connection of the switch SW from the terminal 222 to the terminal 221 in response to the switch signal EX2 from the digital processing unit 245.

The node #3 (communication device 120D) generates an RTS packet RTS10 and transmits the generated RTS packet RTS10 to the node #2 (communication device 120C) by the transmission wave wv2 through the two-dimensional communication sheet 30.

The node #2 (communication device 120C) receives the RTS packet RTS10 and refers to the MAC header of the received RTS packet RTS10 to detect that the RTS packet RTS10 is destined for itself. The node #2 then generates a CTS packet CTS10 as a response packet to the RTS packet RTS10 and transmits the generated packet.

In this case, in each of the sink and the nodes #1 to #N (communication devices 120A to 120G), the switch circuit 22 connects the switch SW to the terminal 221, and therefore if a communication device other than the sink is the source, each of the nodes #1 to #N (communication devices 120B to 120G) does not receive power from any other communication device nor store the power.

As described above, according to the third embodiment, when the sink (communication device 120A) is a source, each of the nodes #1 to #N (communication devices 120B to 120B) separates the transmission wave wv3 received from the sink (communication device 120A) into a signal and power, processes the separated signal and power independently from each other, and stores the power. More specifically, each of the nodes #1 to #N (communication devices 120B to 120B) receives the transmission wave wv3 transmitted from the sink (communication device 120A) and stores it regardless of whether the transmission wave wv3 is destined for itself.

Therefore, the communication devices other than the communicating party can store power, so that the energy preservation efficiency in the two-dimensional communication system 100B can be raised.

The communication device 120 according to the third embodiment includes the coupler 26 used to separate the transmission wave wv3 into the signal (transmission wave wv2) and the power (transmission wave wv1), and therefore signal reception processing and power reception processing can be carried out independently by separating the signal and the power when the signal and the power are transmitted by the single transmission wave wv3. As a result, the interference of the power reception processing upon the signal reception processing can be reduced.

According to the third embodiment, in addition to the above, the same effects as those of the first embodiment are provided.

Figure 18:
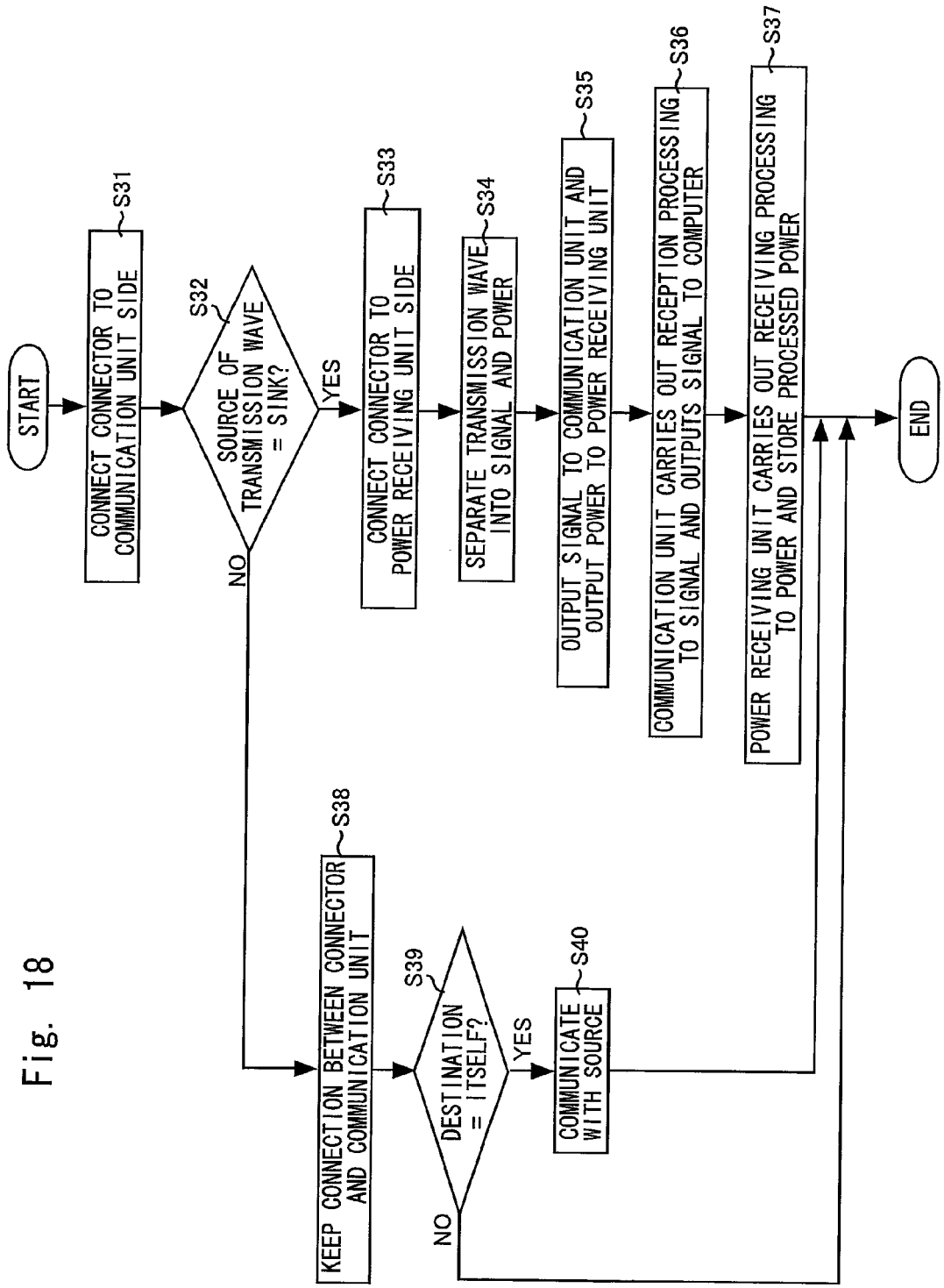
FIG. 18 is a flowchart for illustrating a communication method according to the third embodiment.

FIG. 18 is a flowchart for illustrating a communication method according to the third embodiment. When the series of operation is started, the recharging switch 21 of the communication device 120 supplies the switch circuit 22 with power so that the circuit attains an operation state. The switch circuit 22 connects the switch SW to the terminal 221 and the connector 1 to the side of the communication unit 24 (step S31).

Then, the connector 1 receives an RTS packet through the two-dimensional communication sheet 30 and outputs the received RTS packet to the switch circuit 22, and the switch circuit 22 outputs the RTS packet to the attenuator 23 through the terminal 221. The attenuator 23 attenuates the level of the RTS packet to an allowable level for the communication device 120 and outputs the packet to the amplifier 242, and the amplifier 242 amplifies the RTS packet and outputs the amplified RTS packet to the A/D converter 244. The A/D converter 244 converts the RTS packet RTS from the analog signal to a digital signal and outputs the converted digital signal to the digital processing unit 245.

The digital processing unit 245 refers to the MAC header of the RTS packet to determine whether the source of the RTS packet RTS (transmission wave) is the sink (step S32).

If it is determined in step S32 that the source of the RTS packet is the sink, the digital processing unit 245 generates a switch signal EX1 and outputs the signal to the switch circuit 22, and the switch circuit 22 switches the connection of the switch SW from the terminal 221 to the terminal 222 in response to the switch signal EX1 from the digital processing unit 245. More specifically, the connector 1 is connected to the side of the power receiving unit 25 (step S33).

The connector 1 then receives the transmission wave wv3 from the sink and outputs the received transmission wave wv3 to the coupler 26 through the switch circuit 22. The coupler 26 separates the transmission wave wv3 received from the connector 1 into the transmission waves wv1 and wv2 by the above-described method. More specifically, the coupler 26 separates the transmission wave wv3 into the signal and the power (step S34).

The coupler 26 outputs the separated signal to the communication unit 24 and the separated power to the power receiving unit 25 (step S35).

The communication unit 24 carries out reception processing to the signal received from the coupler 26 and outputs the processed signal to the computer 3 (step S36). The power receiving unit 25 carries out the reception processing to the power received from the coupler 26 and stores the processed power (step S37).

On the other hand, if it is determined in step S32 that the source of the RTS packet is not the sink, the digital processing unit 245 generates a hold signal HLD and outputs the signal to the switch circuit 22, and the switch circuit 22 maintains the connection between the connector 1 and the communication unit 24 in response to the hold signal HLD from the digital processing unit 245 (step S38).

Then, the digital processing unit 245 refers to the MAC hearer of the RTS packet and determines whether the RTS packet is destined for itself (step S39). If it is determined in step S39 that the RTS packet is destined for the communication unit 24, the communication unit 24 carries out communication with the source of the RTS packet (step S40).

After step S37 or if it is determined in step S39 that the RTS packet is not destined for the communication unit 24 or after step 40, the series of operation ends.

As described above, when the source of a transmission wave is the sink, each communication device 120 separates the transmission wave wv3 into a signal and power regardless of whether the transmission wave wv3 is destined for itself and stores the power (see "YES" in step S32 and steps S33 to S37).

Therefore, the power at the sink can be stored not only by its communicating party but also by the nodes other than the communicating party. As a result, the energy preservation efficiency in the two-dimensional communication system 100B can be improved.

The other structure is the same as that of the first embodiment.

Fourth Embodiment

Figure 19:
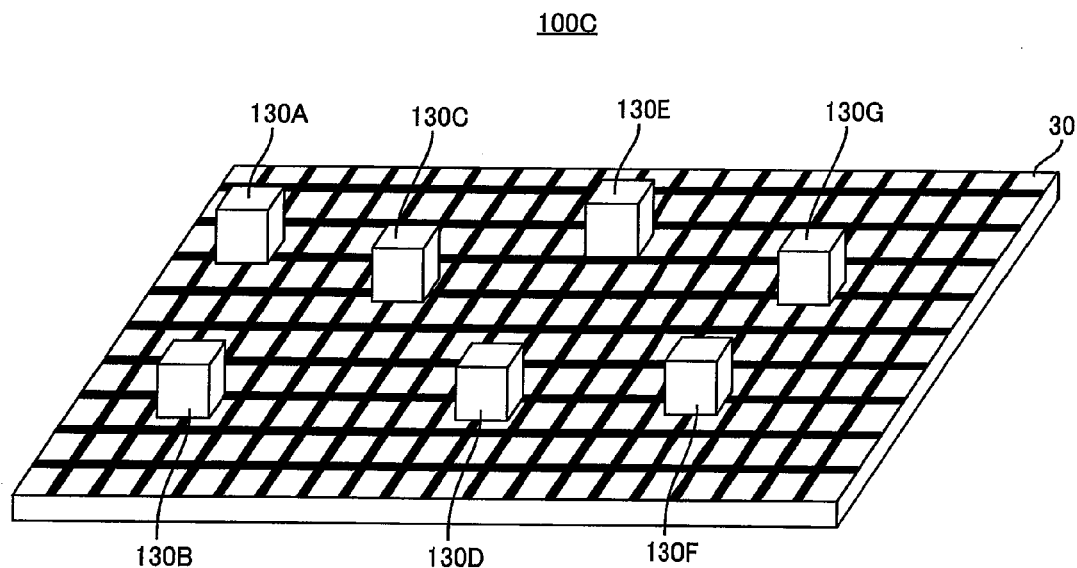
FIG. 19 is a schematic view of a two-dimensional communication system according to a fourth embodiment of the present invention.

FIG. 19 is a schematic diagram of a two-dimensional communication system according to a fourth embodiment of the present invention. Referring to FIG. 19, a two-dimensional communication system 100C according to the fourth embodiment includes a two-dimensional communication sheet 30 and communication devices 130A, 130B, 130C, 130D, 130E, 130F, and 130G.

The communication devices 130A, 130B, 130C, 130D, 130E, 130F, and 130G are provided on the surface of the two-dimensional communication sheet 30 (the surface on the side of the conductor 32). In this case, the communication device 130A for example is a sink and the communication devices 130B, 130C, 130D, 130E, 130F, and 130G are nodes that receive power from the sink (communication device 130A) and store the received power.

Figure 20:
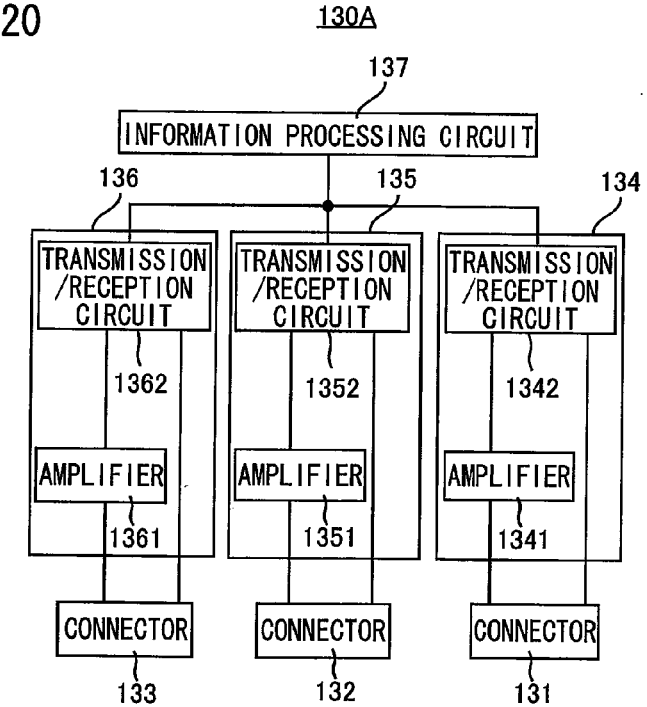
FIG. 20 is a schematic block diagram of the configuration of the communication device (sink) shown in FIG. 19.

FIG. 20 is a schematic block diagram of the configuration of the communication device 130A (sink) shown in FIG. 19. Referring to FIG. 20, the communication device 130A includes connectors 131 to 133, interface devices 134 to 136, and an information processing circuit 137.

The connectors 131 to 133 each have the same function as that of the connector 1 described above and are provided on the two-dimensional communication sheet 30 in contact with one main surface of the two-dimensional communication sheet 30 (the surface on the side of the dielectric 31). The connectors 131 to 133 transmit/receive transmission waves having frequencies f1 to f3. In this case, the frequencies f1 to f3 are different from one another and composed of transmission frequencies tuned so that the waves can be transmitted easily through the dielectric 31 of the two-dimensional communication sheet 30.

The interface devices 134 to 136 are provided corresponding to the connectors 131 to 133, respectively. The interface devices 134 to 136 carry out reception processing to transmission waves received by the connectors 131 to 133 and output the processed reception signal to the information processing circuit 137. The interface devices 134 to 136 carry out transmission processing to the signal received from the information processing circuit 137 and transmit the processed transmission signal through the connectors 131 to 133, respectively.

The information processing circuit 137 receives the reception signal from the interface devices 134 to 136, generates a transmission signal, and outputs the signal to the interface devices 134 to 136.

The interface device 134 includes an amplifier 1341 and a transmission/reception circuit 1342. The amplifier 1341 amplifies a transmission signal SGTX1 received from the transmission/reception circuit 1342 and outputs the amplified transmission signal SGTX1 to the connector 131.

The transmission/reception circuit 1342 receives a transmission wave received by the connector 131 directly from the connector 131, carries out reception processing to the received transmission wave, and outputs the processed reception signal to the information processing circuit 137. In this case, the transmission/reception circuit 1342 attenuates the level of the transmission wave to an allowable level for the communication device 130A, then amplifies the transmission wave, converts the analog signal to a digital signal, and decodes the converted digital signal to carry out the reception processing.

The transmission/reception circuit 1342 modulates the signal received from the information processing circuit 137 by the frequency f1 and converts the modulated digital signal into an analog signal. The transmission/reception circuit 1342 outputs the converted analog signal to the amplifier 1341 as the transmission signal SGTX1.

The interface device 135 includes an amplifier 1351 and a transmission/reception circuit 1352. The amplifier 1351 amplifies a transmission signal SGTX2 received from the transmission/reception circuit 1352 and outputs the amplified transmission signal SGTX2 to the connector 132.

The transmission/reception circuit 1352 receives the transmission wave received by the connector 132 directly from the connector 132, carries out reception processing to the received transmission wave by the same method as the method by the transmission/reception circuit 1342, and outputs the processed reception signal to the information processing circuit 137.

The transmission/reception circuit 1352 modulates the signal received from the information processing circuit 137 by the frequency f2 and converts the modulated digital signal into an analog signal. The transmission/reception circuit 1352 outputs the converted analog signal to the amplifier 1351 as the transmission signal SGTX2.

The interface device 136 includes an amplifier 1361 and a transmission/reception circuit 1362. The amplifier 1361 amplifies a transmission signal SGTX3 received from the transmission/reception circuit 1362 and outputs the amplified transmission signal SGTX3 to the connector 132.

The transmission/reception circuit 1362 receives the transmission wave received by the connector 133 directly from the connector 133, carries out the reception processing to the received transmission wave by the same method as the method by the transmission/reception circuit 1342, and outputs the processed reception signal to the information processing circuit 137.

The transmission/reception circuit 1362 modulates the signal received from the information processing circuit 137 by the frequency f3 and converts the modulated digital signal into an analog signal. The transmission/reception circuit 1362 outputs the converted analog signal to the amplifier 1361 as the transmission signal SGTX3.

Note that the transmission/reception circuits 1342, 1352, and 1362 transmit control packets such as RTS packets and data packets by transmission waves wv4 to wv6, respectively.

The transmission waves wv4 to wv6 have the frequencies f1 to f3, respectively and have the same amplitude as that of the transmission wave wv1.

The transmission/reception circuits 1342, 1352, and 1362 periodically transmit the transmission waves wv4 to wv6, respectively, when there is no data packet to transmit.

Figure 21:
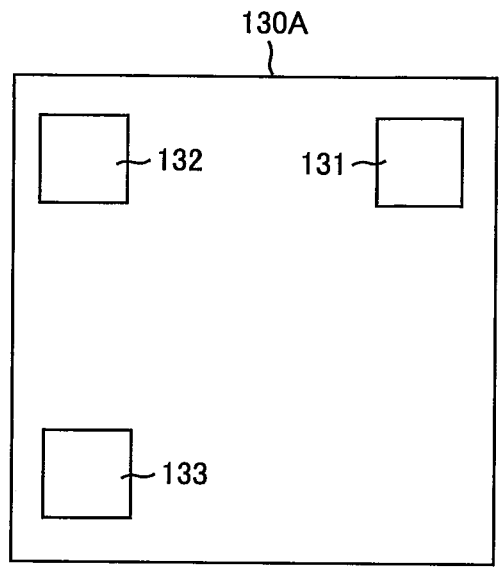
FIG. 21 is a plan view of the communication device when seen from the side of a connector shown in FIG. 20.

FIG. 21 is a plan view of the communication device 130A as seen from the side of the connectors 131 to 133 shown in FIG. 20. Referring to FIG. 21, the connectors 131 to 133 each having an approximately regular square shape are provided at three corners of the communication device 130A. The connectors 131 to 133 each have for example a size of 1 cm square.

Figure 22:
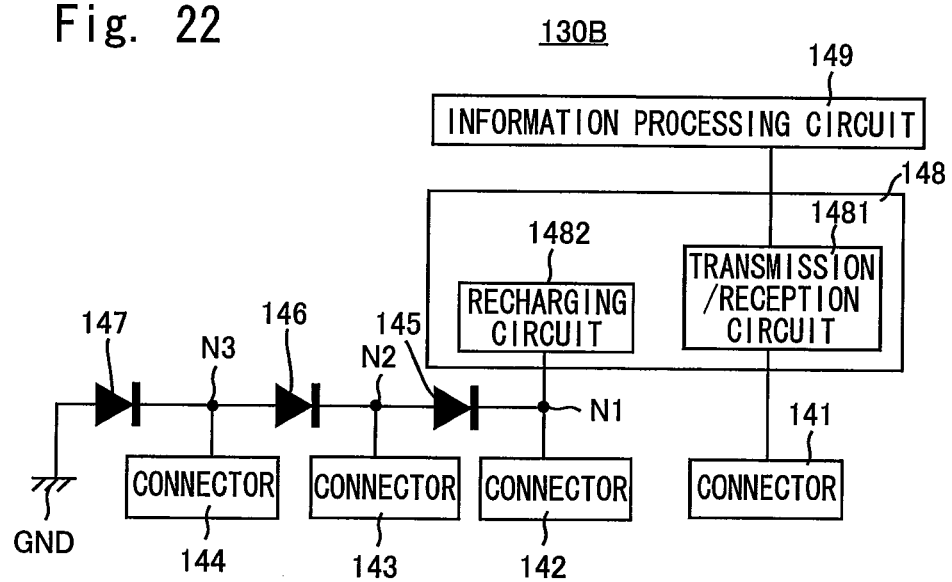
FIG. 22 is a schematic block diagram of the configuration of the communication device (communication nodes other than the sink) shown in FIG. 19.

FIG. 22 is a schematic block diagram of the configuration of the communication device 130B (a communication node other than the sink) shown in FIG. 19. Referring to FIG. 22, the communication device 130B includes connectors 141 to 144, diodes 145 to 147, an interface device 148, and an information processing circuit 149.

The connectors 141 to 144 each have the same function as that of the connector 1 described above and are provided on the two-dimensional communication sheet 30 in contact with one main surface of the two-dimensional communication sheet 30 (on the surface on the side of the dielectric 31). The connector 141 transmits/receives any of transmission waves wv4 to wv6 having frequencies f1 to f3, respectively. The connectors 142 to 144 receive transmission waves wv4 to wv6 having frequencies f1 to f3, respectively and output the received transmission waves wv4 to wv6 to the interface device 148. In this case, the connector 142 outputs the received transmission wave wv4 directly to the interface device 148, the connector 143 outputs the received transmission wave wv5 to the interface device 148 through the diode 145, and the connector 144 outputs the received transmission wave wv6 to the interface device 148 through the diodes 145 and 146. Note that the connectors 142 to 144 can only receive the transmission waves wv4 to wv6, respectively, and cannot transmit the transmission waves.

The diode 145 is connected between the nodes N1 and N2 so as to let power pass from the node N2 side to the node N1 side. In this case, the node N1 is the node between the connector 142 and the interface device 148.

The diode 146 is connected between the nodes N2 and N3 so as to pass power from the node N3 side to the node N2 side.

The diode 146 is also connected between the ground potential GND and the node N3 so as to pass power from the side of the ground potential GND to the node N3 side.

The interface device 148 receives a transmission wave (any of the transmission waves wv4 to wv6) received by the connector 141, carries out reception processing to the received transmission wave, and outputs the processed reception signal to the information processing circuit 149. The interface device 148 receives a signal from the information processing circuit 149, carries out transmission processing to the received signal, and outputs the processed transmission signal to the connector 141. The interface device 148 also carries out reception processing to the transmission waves wv4 to wv6 received from the connectors 142 to 144, respectively, and stores the processed power.

The information processing circuit 149 receives a reception signal from the interface device 148, generates a signal and outputs the signal to the interface device 148.

The interface device 148 includes a transmission/reception circuit 1481 and a recharging circuit 1482. The transmission/reception circuit 1481 controls the connector 141 to scan which transmission wave among the transmission waves wv4 to wv6 can be received. The transmission/reception circuit 1481 also carries out reception processing to the transmission wave (any of the transmission waves wv4 to wv6) received by the connector 141, and outputs the processed reception signal to the information processing circuit 149.

The transmission/reception circuit 1481 modulates the signal received from the information processing circuit 149 by a frequency (any of the frequencies f1 to f3) that can be transmitted by the connector 141, converts the modulated digital signal into an analog signal, and outputs the signal to the connector 141.

The recharging circuit 1482 converts the transmission waves wv4 to wv6 received from the connectors 142 to 144, respectively from AC power into DC power and recharges with the obtained DC power.

Figure 23:
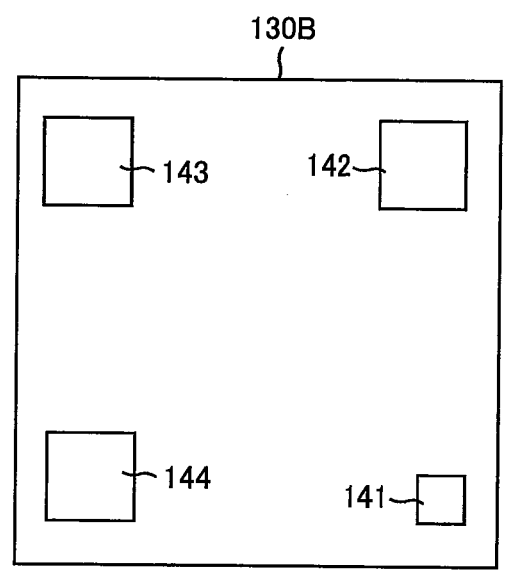
FIG. 23 is a plan view of the communication device when seen from the side of a connector shown in FIG. 22.

FIG. 23 is a plan view of the communication device 130B as viewed from the sides of the connectors 141 to 144 shown in FIG. 22. Referring to FIG. 23, the connectors 141 to 144 having an approximately regular square shape are provided at the four corners of the communication device 130B. The connector 141 for example has a size of 0.5 cm square, and the connectors 142 to 144 each have for example a size of 1 cm square.

Note that the communication devices 130C to 130G shown in FIG. 19 each have the same configuration as that of the communication device 130B shown in FIGS. 22 and 23.

The communication devices 130A to 130G carry out communication according to any of the flowcharts shown in FIGS. 9, 13, and 18. In this case, the communication device 130A as a sink transmits transmission waves wv4 to wv6 that each form a data packet or a control packet at a time, and the connector 141 in each of the communication devices 130B to 130G receives a transmission wave (any of the transmission waves wv4 to wv6) having a frequency that can be received by itself (any of the frequencies f1 to f3).

The communication devices 130B to 130G each receive any one of the transmission waves wv4 to wv6 by the connector 141 and output the transmission wave to the transmission/reception circuit 1481, and receive the transmission waves wv4 to wv6 by the connectors 142 to 144, respectively and output the received waves to the recharging circuit 1482.

In each of the communication devices 130B to 130G, the transmission/reception circuit 1481 carries out reception processing to the transmission wave (any of the transmission waves wv4 to wv6) received from the connector 141 and outputs the processed reception signal to the information processing circuit 149. Then, the information processing circuit 149 of the communication device that is the destination of the data packet among the communication devices 130B to 130G receives the data packet received from the transmission/reception circuit 1481, and the information processing circuits 149 in the communication devices other than the destination of the data packet discard the data packet received from the transmission/reception circuit 1481.

In each of the communication devices 130B to 130G, the recharging circuit 1482 converts the transmission waves wv4 to wv6 received from the connectors 142 to 144, respectively from the AC power to DC power and stores the converted DC power. In this way, the communication devices 130B to 130G each receive and store power regardless of whether the data packet is destined for itself.

In this way, the communication device 130A as the sink transmits a control packet or a data packet using a plurality of transmission waves wv4 to wv6 that can be stored as power, and the communication devices 130B to 130G other than the sink carry out reception processing to one of the transmission waves wv4 to wv6 to receive the signal and carry out reception processing to the plurality of transmission waves wv4 to wv6 to store power. In this case, the communication device 130A as the sink transmits control packets or data packets by transmission waves having the same amplitude, and the connector 141 receives the power of the transmission waves wv4 to wv6 in a reduced level and outputs it to the transmission/reception circuit 1481, so that if interference occurs while the transmission waves wv4 to wv6 having different frequencies are transmitted through the two-dimensional communication sheet 30, the transmission/reception circuit 1481 receives the transmission wave with reduced interference from the connector 141. As a result, the transmission/reception circuit 1481 carries out reception processing with reduced mutual interference among the plurality of transmission waves wv4 to wv6.

Therefore, according to the present invention, the signal reception and the power reception can be carried out while degradation in the transmission performance of the signals can be suppressed.

The communication device 130A as the sink transmits a control packet or a data packet using the plurality of transmission waves wv4 to wv6 that can be stored as power, and the communication devices 130B to 130G other than the sink store the plurality of transmission waves wv4 to wv6 as power.

Therefore, in the two-dimensional communication system 100C, more power can be transmitted to the communication devices 130B to 130G other than the sink as compared to the case of transmitting power by one transmission wave wv1 or wv3. A transmission wave at each frequency has its power restricted according to the Radio Law, and it is therefore advantageous that more power can be transmitted to the communication devices 130B to 130G other than the sink by transmitting the power by the plurality of transmission waves wv4 to wv6 as described above.

Furthermore, in the two-dimensional communication system 100C, the communication device 130A as the sink transmits signals at the plurality of frequencies at a time, so that the throughput when the sink transmits a data packet can be increased.

As described above, according to the fourth embodiment, the communication device 130A as the sink transmits a control packet or a data packet by the transmission waves wv4 to wv6 having the same amplitude level and the communication devices 130B to 130G other than the sink receive the transmission waves wv4 to wv6 as signals by reducing the power of the transmission waves wv4 to wv6 (the area of the connector 141 is smaller than the area of the connectors 131 to 133) and maintains and stores the power of the transmission waves wv4 to wv6.

Note that according to the fourth embodiment, the communication device 130A as the sink does not transmit a signal when the communication devices 130B to 130G other than the sink transmit signals. This is because the communication devices 130B to 130G other than the sink transmit signals using the connector 141 having a smaller area than the connectors 131 to 133, and therefore if the communication device 130A as the sink transmits a signal while the communication devices 130B to 130G other than the sink transmit signals, the signals transmitted by the communication devices 130B to 130G other than the sink are buried in the signal transmitted from the communication device 130A as the sink. For the same reason, the communication devices 130B to 130G other than the sink do not transmit signals while the communication device 130A as the sink transmits a signal.

In general, according to the fourth embodiment, the communication device 130A as the sink needs only have a plurality of connectors instead of the three connectors 131 to 133, and the communication devices 130B to 130G other than the sink need only have a single connector used to transmit/receive a signal and a plurality of connectors used to receive power instead of the four connectors 141 to 144. In the communication devices 130A to 130G, the plurality of the connectors are determined as the same number as the number of frequencies used in the two-dimensional communication system 100C.

Figure 24:
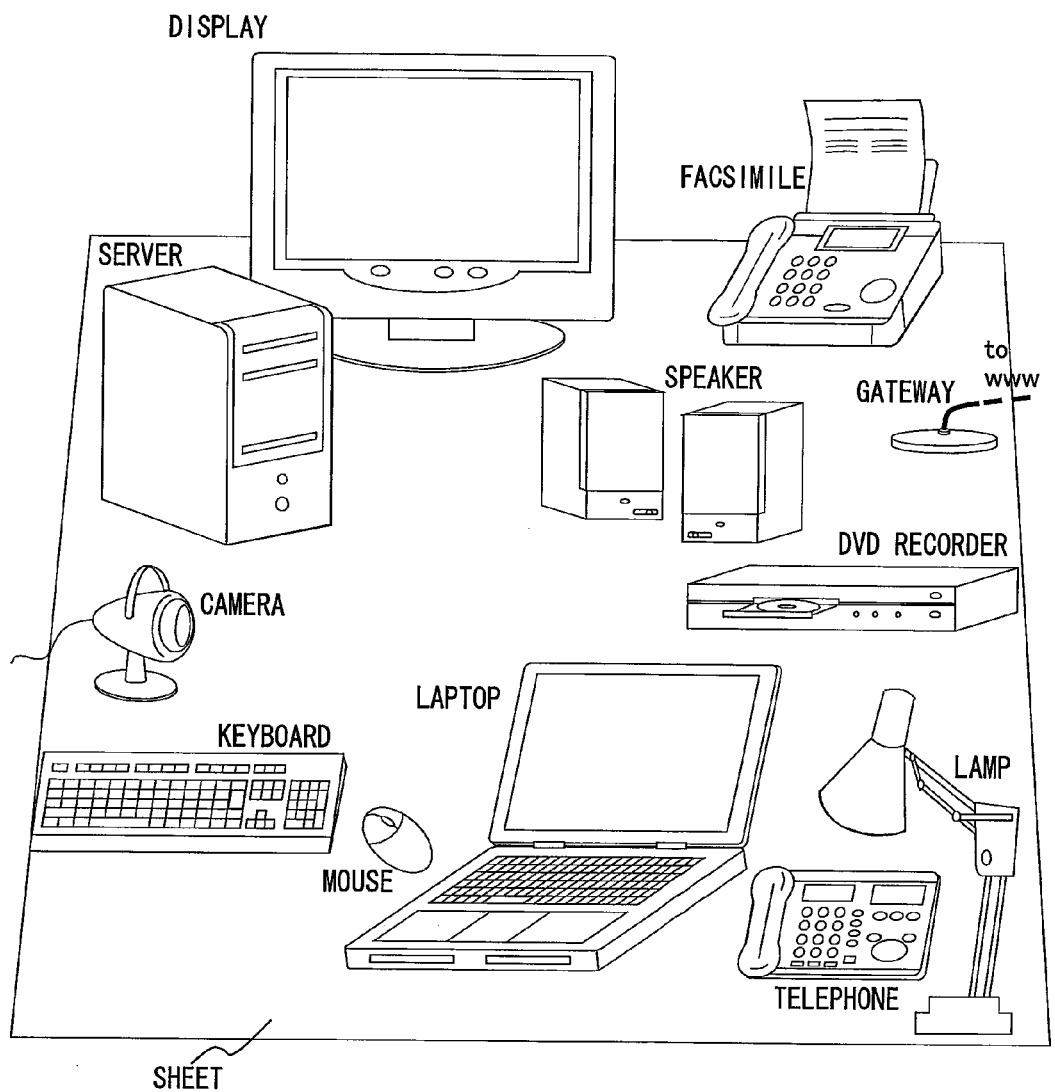
FIG. 24 is a view of a specific example of a two-dimensional communication system.

FIG. 24 is a view of a specific example of the two-dimensional communication system. Referring to FIG. 24, the sheet is the two-dimensional communication sheet 30 (see FIGS. 2 and 3) described above, and a display, a server, a facsimile, a speaker, a gateway, a DVD recorder, a laptop, a mouse, a keyboard, a camera, a lamp, and a telephone each include one of the communication devices 10, 110, 120, and 130A to 130G.

The display, the server, the facsimile, the speaker, the gateway, the DVD recorder, the laptop, the mouse, the keyboard, the camera, the lamp, and the telephone are provided on the sheet, one of the devices serves as a sink, and the other devices serve as nodes #1 to #N.

The display, the server, the facsimile, the speaker, the gateway, the DVD recorder, the laptop, the mouse, the keyboard, the camera, the lamp, and the telephone carry out two-dimensional communication by any of the communication methods according to the first to third embodiments described above.

In this case, the laptop, the keyboard, and the mouse constitute one personal computer but they are not connected to one another by a cable and they transmit/receive signals by two-dimensional communication through the sheet. The gateway is connected to a network such as the Internet by a cable and transmits information obtained from the network to the display, the server, the facsimile, the speaker, the DVD recorder, the laptop, the mouse, the keyboard, the camera, the lamp, and the telephone provided on the sheet. Furthermore, the display, the server, the facsimile, the speaker, the DVD recorder, the laptop, the mouse, the keyboard, the camera, the lamp, and the telephone on the sheet transmit information to the network through the gateway.

In this way, using the two-dimensional communication system, the devices do not have to be connected by a cable and can be provided indoors in a compact manner.

Note that according to the present invention, the two-dimensional communication sheet 30 forms a "two-dimensional communication medium" and the computer 3 or the information processing circuit 149 forms a "signal processing circuit."

The transmission wave wv3 forms a "first transmission wave," the transmission wave wv2 forms a "second transmission wave," and the transmission waves wv1 and wv4 to wv6 each form a "third transmission wave."

The coupler 26 forms a "separating circuit."

Furthermore, the connectors 142 to 144 form a "plurality of first connectors," and the connector 141 forms a "second connector."

It is to be understood that the embodiments disclosed herein are illustrative and not restrictive. The scope of the invention is defined by the appended claims rather than by the description of the embodiments preceding them, and all modifications that fall within the scope of claims and equivalence thereof are intended to be embraced by the claims.

Industrial Applicability

The present invention is applied to a communication device capable of receiving a signal and power while reducing degradation in the signal transmission performance. The present invention is also applied to a two-dimensional communication system using a communication device capable of receiving a signal and power while reducing degradation in the signal transmission performance.

What is claimed is:

1. A communication device that carries out communication using a two-dimensional communication medium, comprising:
a connector configured to receive any one of a first transmission wave produced by superposing a signal with a transmission frequency of said two-dimensional communication medium on power with said transmission frequency, a second transmission wave including other signal with said transmission frequency, and a third transmission wave including other power with said transmission frequency through said two-dimensional communication medium;
a signal processing circuit; and
an interface device configured to carry out reception processing on said signal and reception processing on said power independently from each other based on said first transmission wave, to output said processed signal to said signal processing circuit, and to store said processed power, when said connector receives said first transmission wave, wherein
said interface device is configured to carry out reception processing on said second transmission wave and to output said other signal to said signal processing circuit when said connector receives said second transmission wave,
said interface device is configured to store said third transmission wave as other power when said connector receives said third transmission wave, and
said connector is configured to receive said first or second transmission wave from said two-dimensional communication medium, and
said interface device includes:
a communication unit configured to carry out reception processing on said signal and to output the processed signal to said signal processing circuit;
a power receiving unit configured to carry out reception processing on said power and to store the processed power;
a separation circuit configured to separate said first transmission wave into said signal and said power, to output the separated signal to said communication unit, and to output the separated power to said power receiving unit; and
a switch circuit configured to connect said connector to said separation circuit when said connector receives said first transmission wave and said connector to said communication unit when said connector receives said second transmission wave.

2. The communication device according to claim 1, wherein said communication unit is configured to receive said stored processed power supplied from said power receiving unit.

3. The communication device according to claim 1, wherein said connector is configured to receive said first transmission wave from a power node through said two-dimensional communication medium.

4. The communication device according to claim 3, wherein said power node is a communication node that receives a plurality of pieces of detection data detected by a plurality of sensors in a sensor system.

5. The communication device according to claim 1, wherein said separation circuit is configured to separate said first transmission wave into said signal and said power by internally dividing the amplitude of said first transmission wave in the ratio of the amplitude of said signal and the amplitude of said power.

6. The communication device according to claim 5, wherein said connector is configured to receive said first transmission wave from a power node through said two-dimensional communication medium.

7. The communication device according to claim 6, wherein said power node is a communication node that receives a plurality of pieces of detection data detected by a plurality of sensors in a sensor system.

8. The communication device according to claim 1, wherein said connector (1) is configured to receive said second or third transmission wave from said two-dimensional communication medium, and
said interface device includes:
a communication unit configured to carry out reception processing on said other signal in the second transmission wave and to output the processed other signal to said signal processing circuit;
a power receiving unit configured to carry out reception processing on said other power in the third transmission wave and to store the processed other power; and
a switch circuit configured to connect said connector to said communication unit or said power receiving unit in response to a destination of said second transmission wave or the presence/absence of the operation of said communication unit.

9. The communication device according to claim 8, wherein said switch circuit is configured to connect said connector to said communication unit when said connector receives said second transmission wave including a transmission request signal (RTS) from a power node capable of transmitting said power,
said switch circuit is configured to connect said connector to said power receiving unit when said connector receives said second transmission wave including a communication permission signal (CTS) corresponding to said transmission request signal (RTS) from a communication node as a communicating party with said power node, and
said power receiving unit is configured to carry out reception processing on said third transmission wave received by said connector from said power node and stores the processed power.

10. The communication device according to claim 9, wherein said power node is a communication node that receives a plurality of pieces of detection data detected by a plurality of sensors in a sensor system.

11. The communication device according to claim 8, wherein said switch circuit is configured to connect said connector to a power receiving unit when said communication unit stops communicating and said connector to said communication unit when said communication unit starts to communicate, and
said power receiving unit is configured to carry out reception processing on said third transmission wave received by said connector from said power node and to store the processed power when said communication unit stops communicating.

12. The communication device according to claim 8, wherein said switch circuit is configured to connect said connector to said communication unit when said connector receives said second transmission wave including a transmission request signal (RTS) from a power node capable of transmitting said power, and said switch circuit is configured to keep said connector and said communication unit connected with each other when said communication unit transmits said second transmission wave including a communication permission signal (CTS) corresponding to said transmission request signal (RTS) to said power node through said connector.

13. The communication device according to claim 12, wherein said power node is a communication node that receives a plurality of pieces of detection data detected by a plurality of sensors in a sensor system.

14. The communication device according to claim 8, wherein said switch circuit is configured to connect said connector to said communication unit when the connector receives said second transmission wave from a node other than a power node capable of transmitting said power and keeps said connector and said communication unit connected with each other.

15. The communication device according to claim 14, wherein said power node is a communication node that receives a plurality of pieces of detection data detected by a plurality of sensors in a sensor system.

16. A two-dimensional communication system, comprising:
a two-dimensional communication medium transmitting a transmission wave; and
a plurality of communication devices provided on said two-dimensional communication medium,
said plurality of communication devices each including:
a connector configured to receive any one of a first transmission wave produced by superposing a signal with a transmission frequency of said two-dimensional communication medium on power with said transmission frequency, a second transmission wave including other signal with said transmission frequency, and a third transmission wave including other power with said transmission frequency through said two-dimensional communication medium;
a signal processing circuit; and
an interface device configured to carry out reception processing on said signal and reception processing on said power independently from each other based on said first transmission wave, to output said processed signal to said signal processing circuit, and to store said processed power, when said connector receives said first transmission wave, wherein
said interface device is configured to carry out reception processing on said second transmission wave and to output said other signal to said signal processing circuit when said connector receives said second transmission wave,
said interface device is configured to store said third transmission wave as other power when said connector receives said third transmission wave, and
said connector is configured to receive said first or second transmission wave from said two-dimensional communication medium, and
said interface device includes:
a communication unit configured to carry out reception processing on said signal and to output the processed signal to said signal processing circuit;
a power receiving unit configured to carry out reception processing on said power and storing the processed power;
a separation circuit configured to separate said first transmission wave into said signal and said power, to output the separated signal to said communication unit, and to output said separated power to said power receiving unit; and
a switch circuit configured to connect said connector to said separation circuit when said connector receives said first transmission wave and said connector to said communication unit when said connector receives said second transmission wave.

* * * * *